Oct. 8, 1940.    H. BRUCKER    2,216,733
MACHINE FOR INSERTING POURING SPOUTS INTO CONTAINERS
Filed Oct. 5, 1937    23 Sheets-Sheet 2

INVENTOR
Henry Brucker,
BY
Harry B. Rook,
ATTORNEY

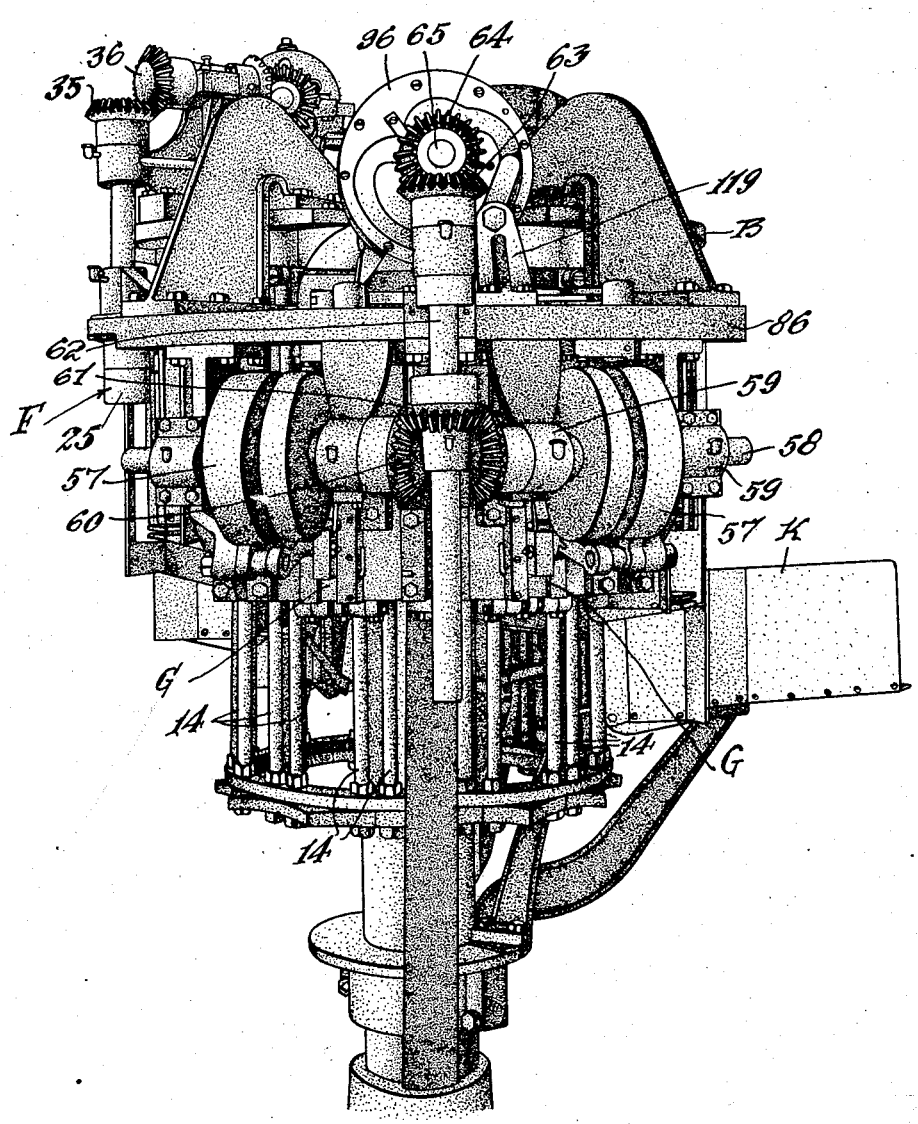

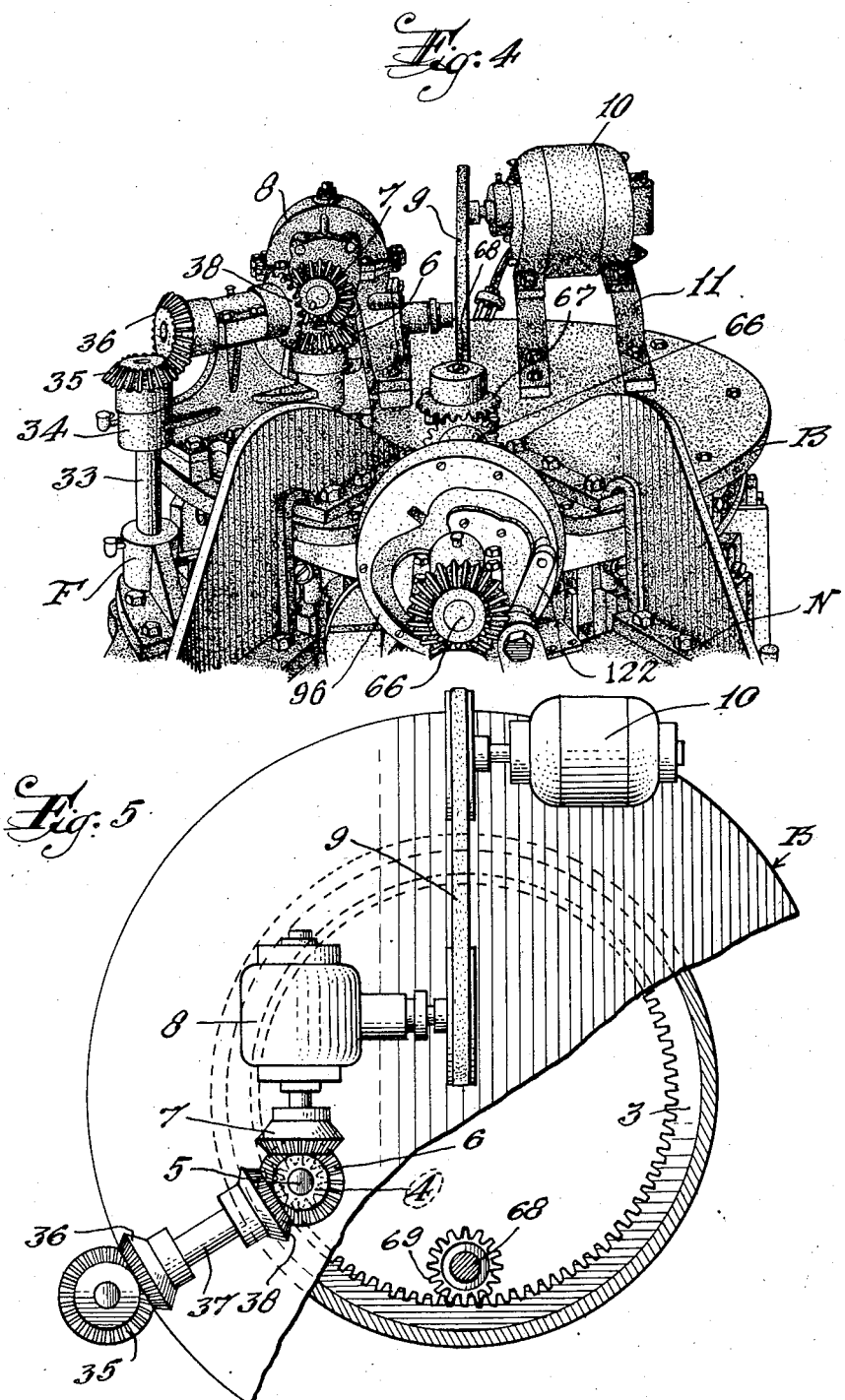

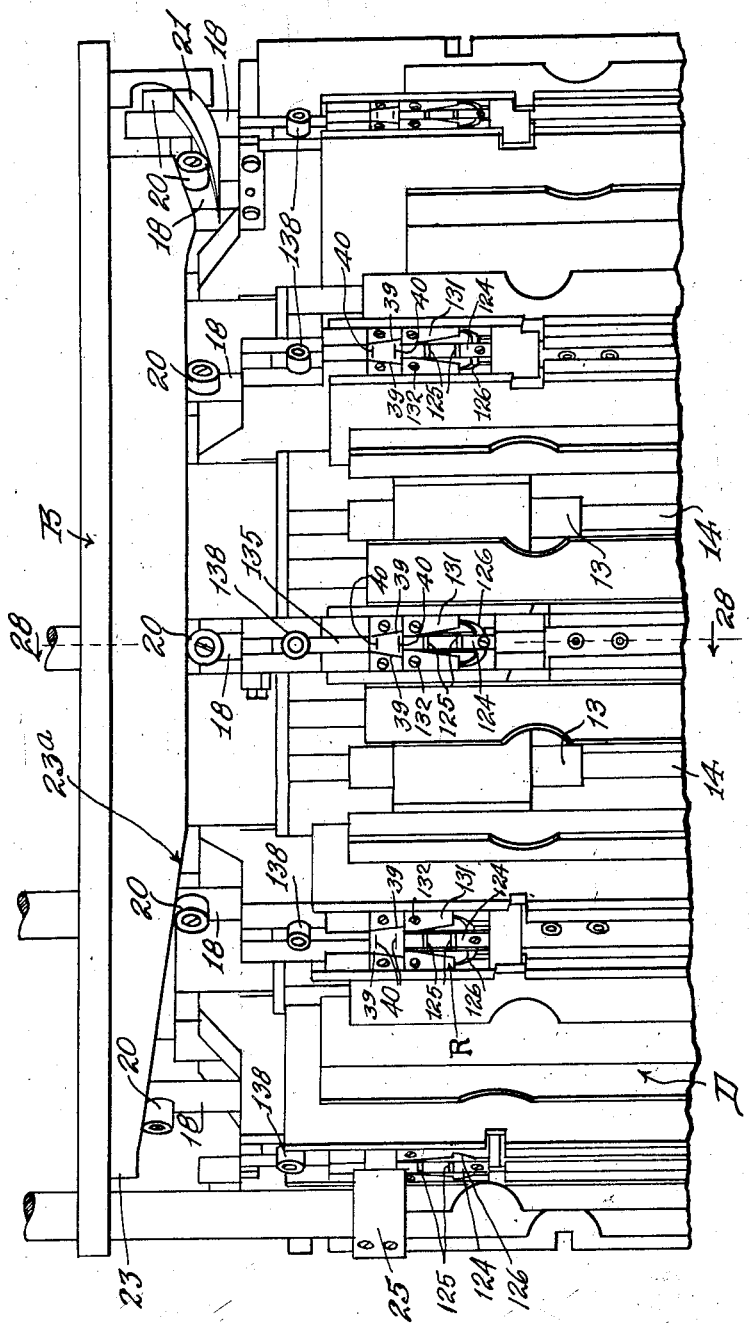

Oct. 8, 1940.   H. BRUCKER   2,216,733
MACHINE FOR INSERTING POURING SPOUTS INTO CONTAINERS
Filed Oct. 5, 1937   23 Sheets-Sheet 6
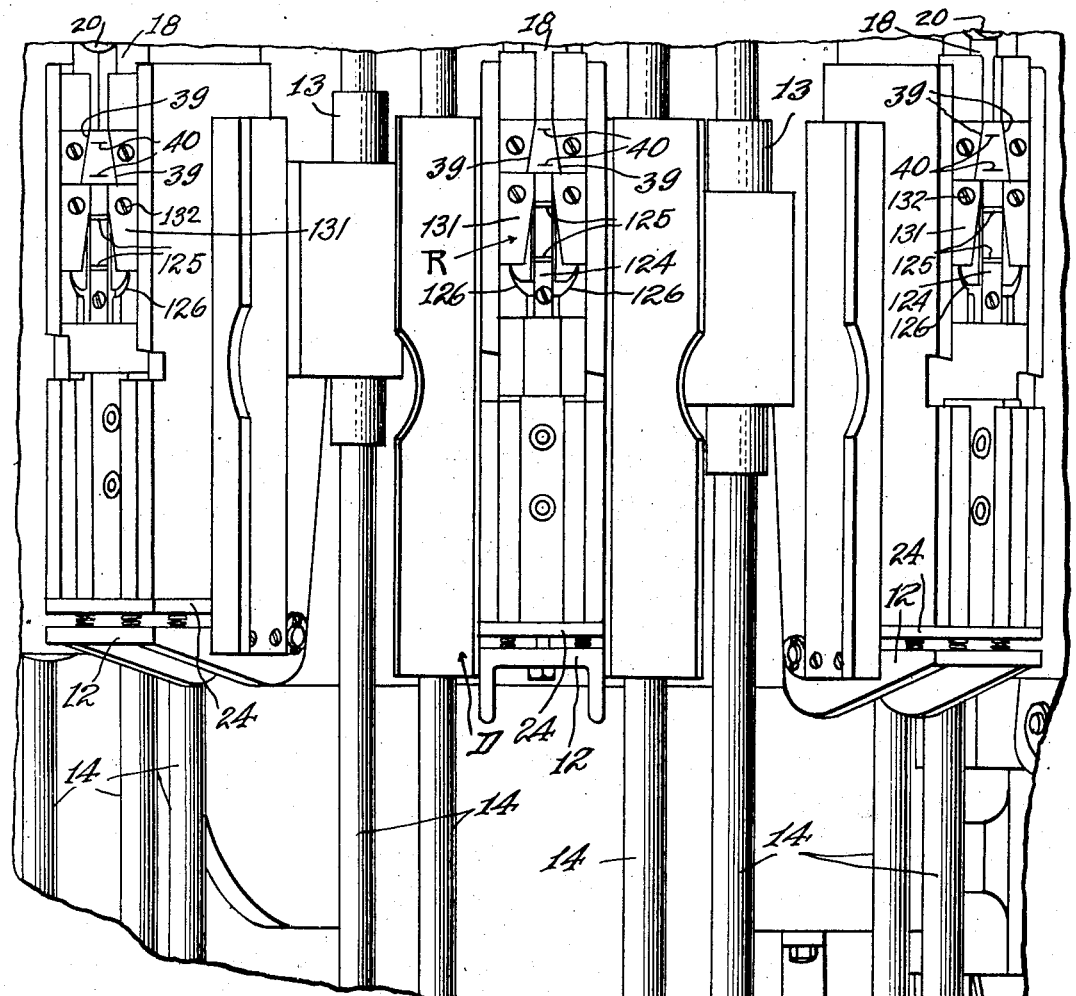
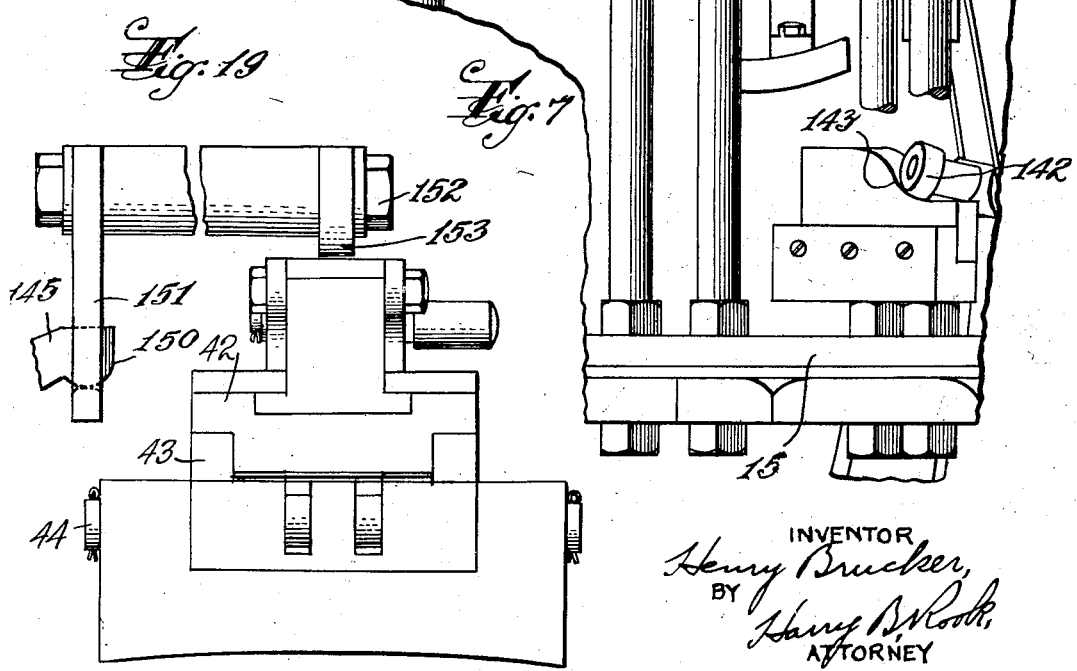

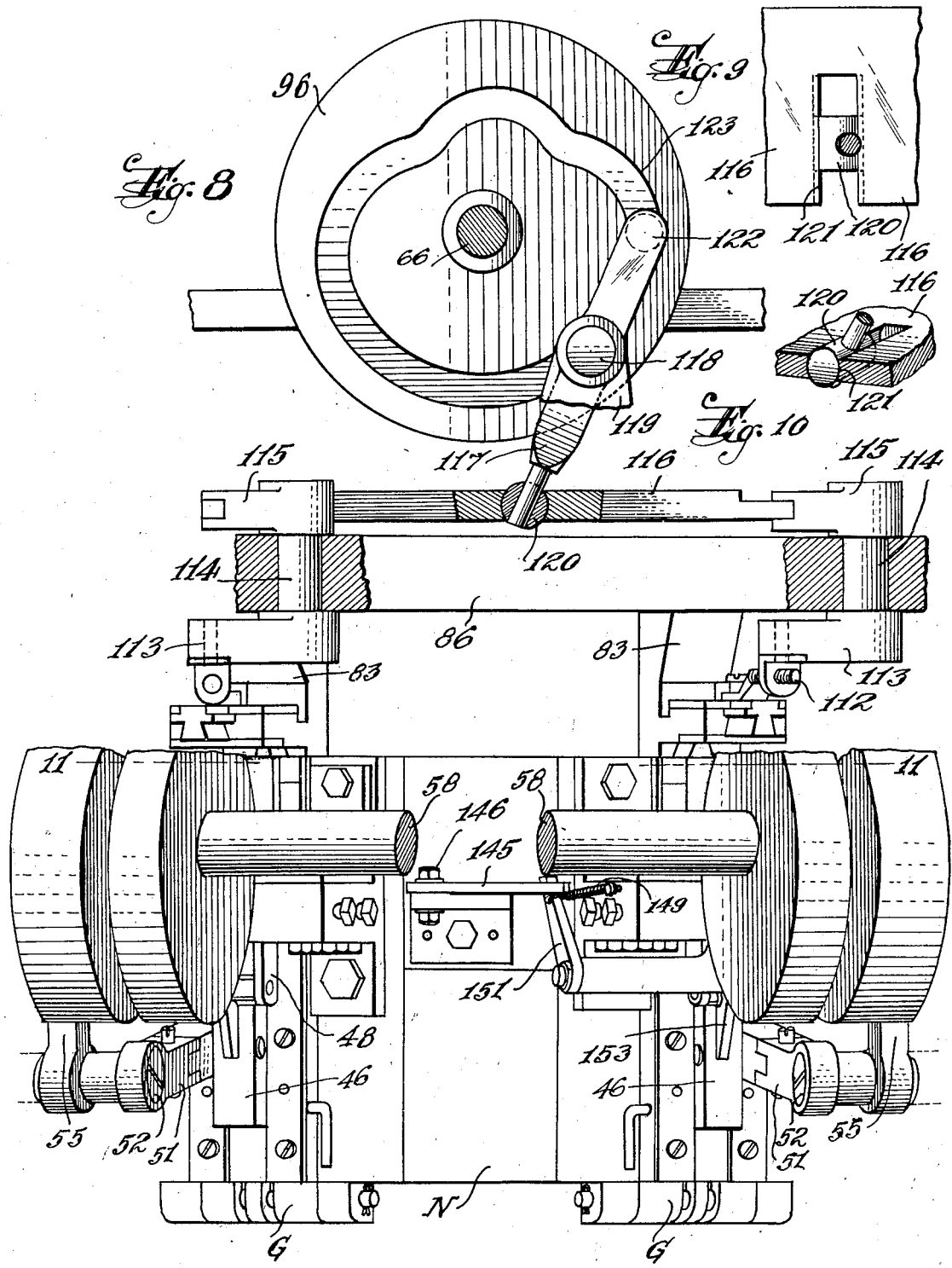

Oct. 8, 1940. H. BRUCKER 2,216,733
MACHINE FOR INSERTING POURING SPOUTS INTO CONTAINERS
Filed Oct. 5, 1937 23 Sheets-Sheet 8

INVENTOR
Henry Brucker,
BY Harry B. Rook,
ATTORNEY

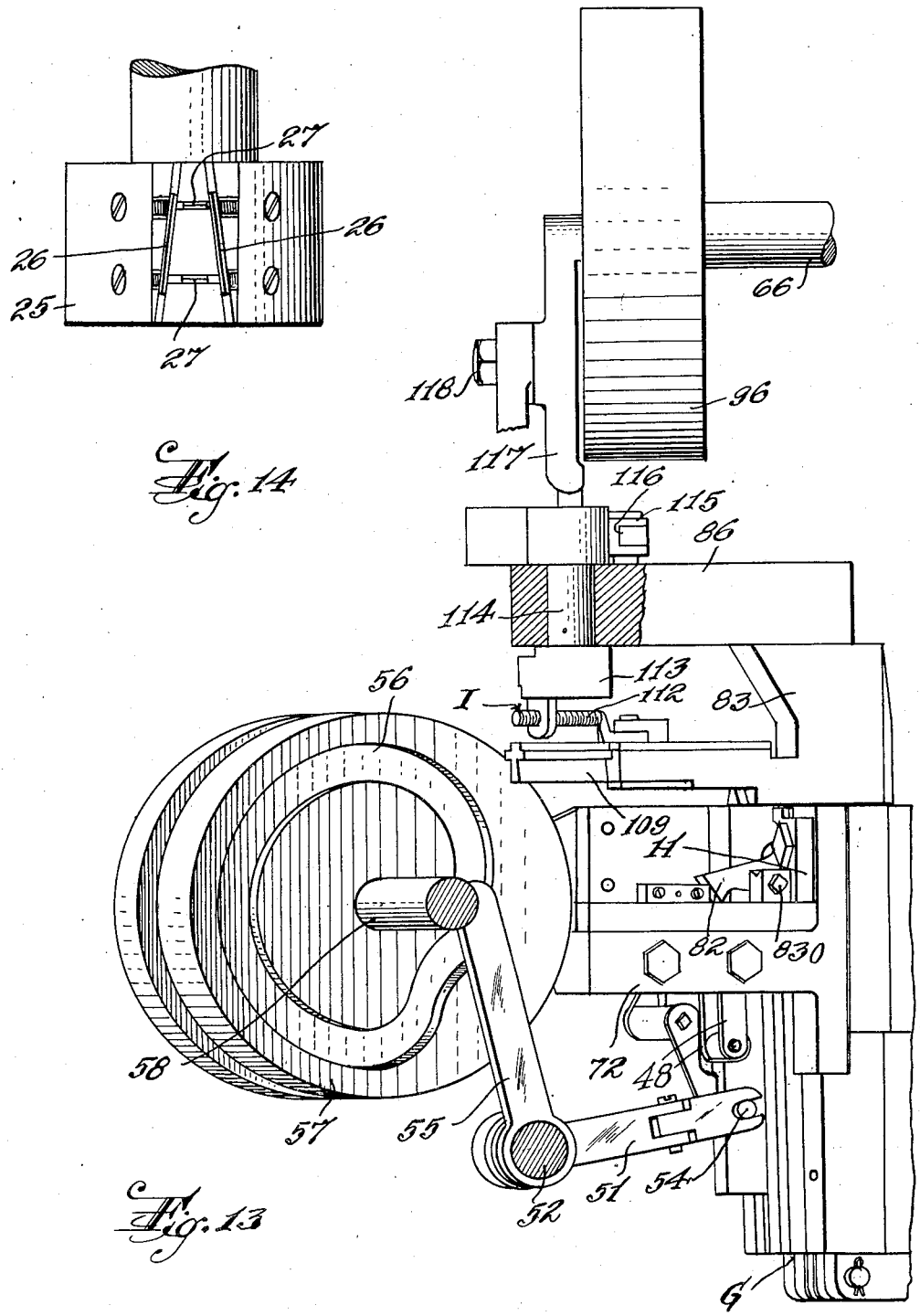

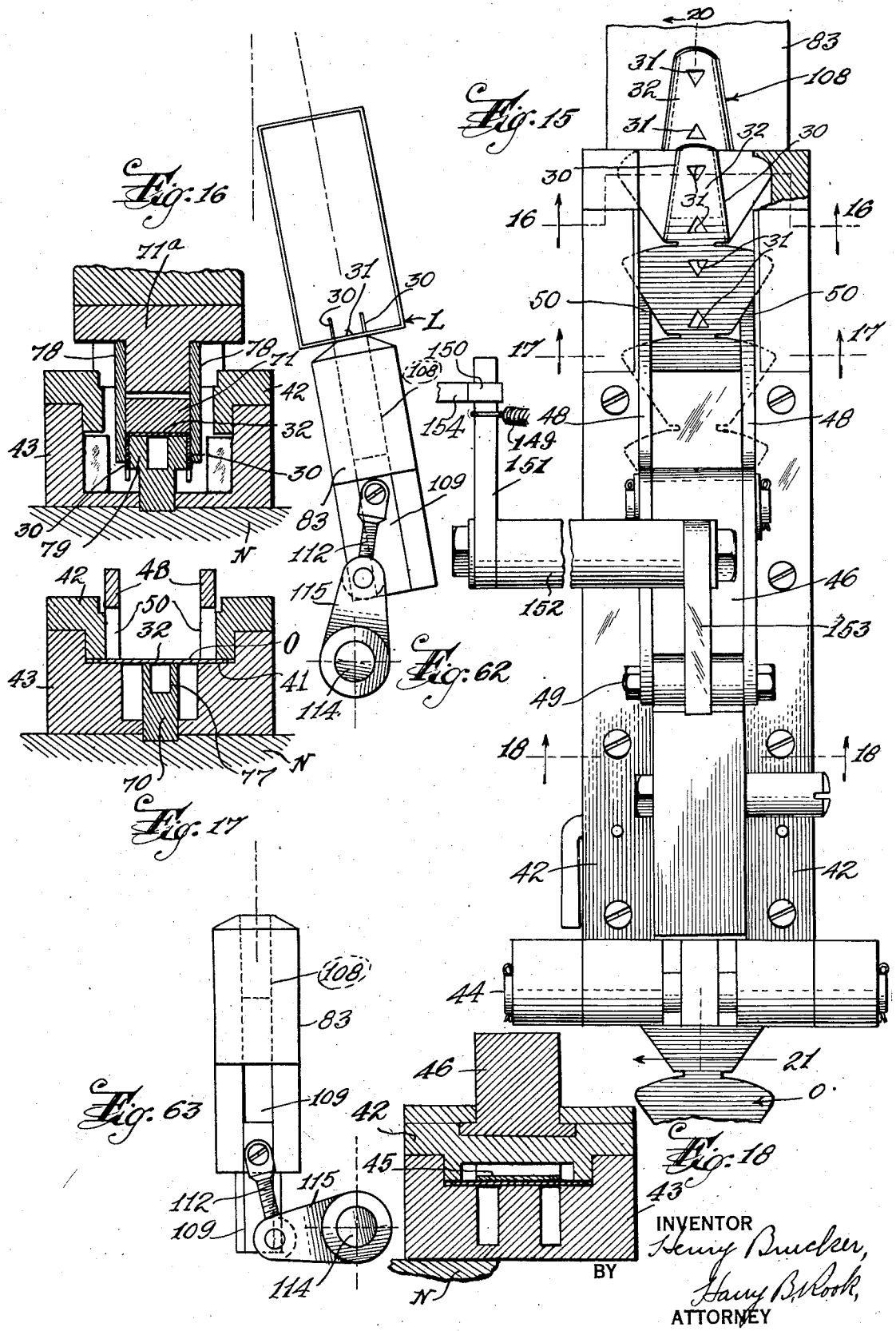

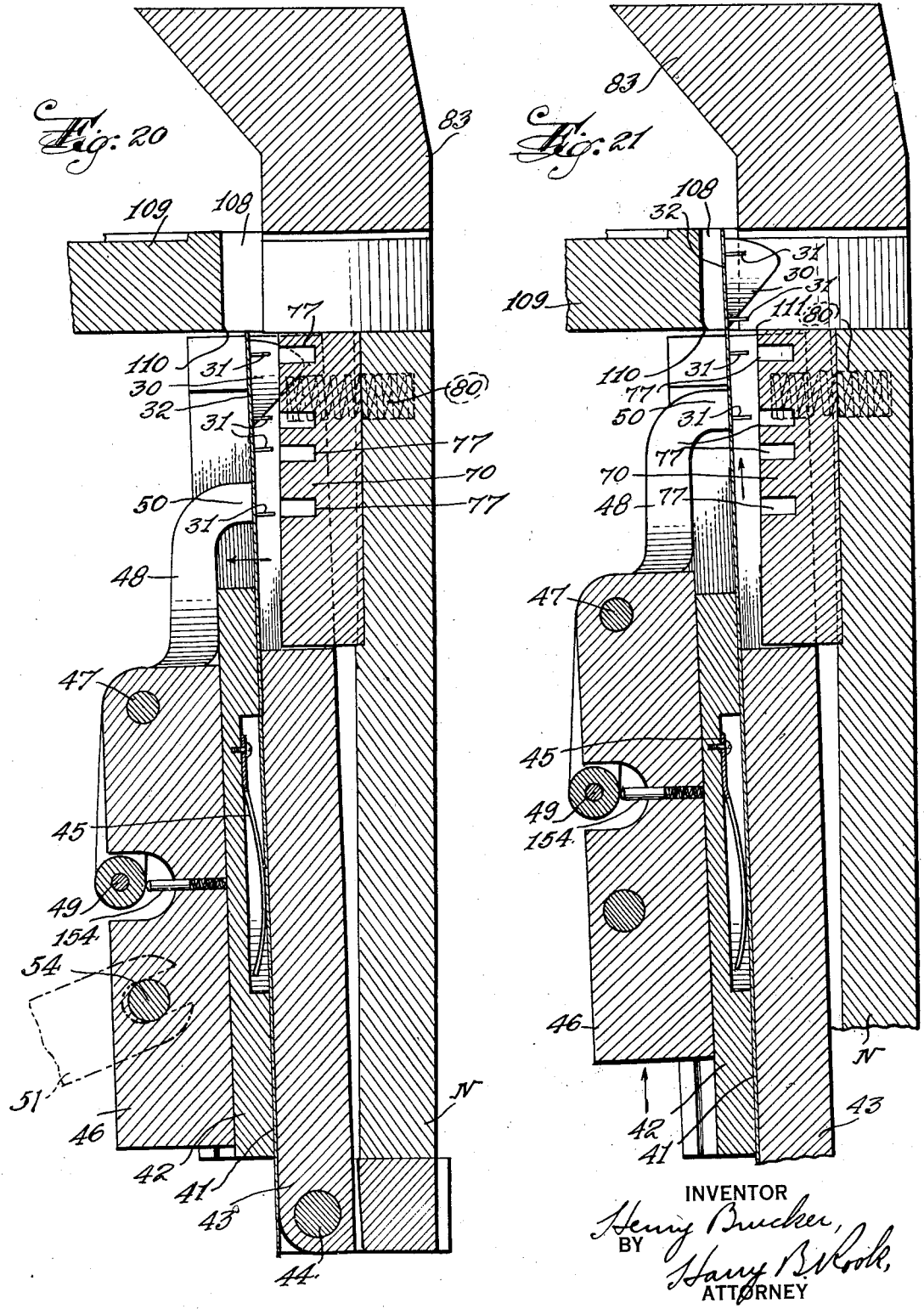

Oct. 8, 1940.    H. BRUCKER    2,216,733
MACHINE FOR INSERTING POURING SPOUTS INTO CONTAINERS
Filed Oct. 5, 1937    23 Sheets-Sheet 12
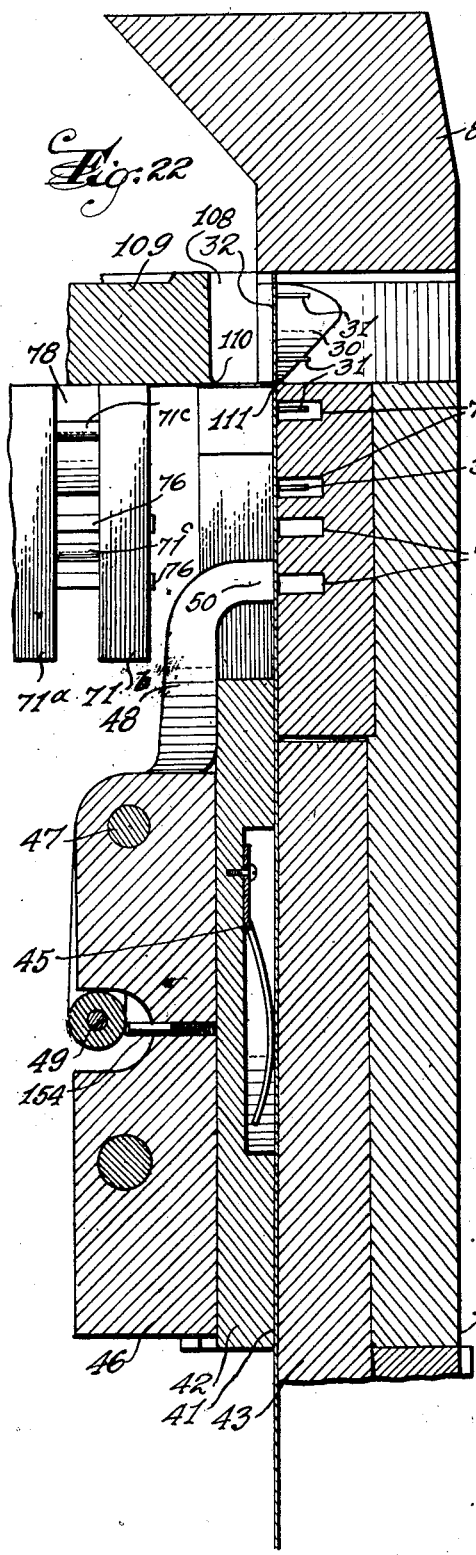
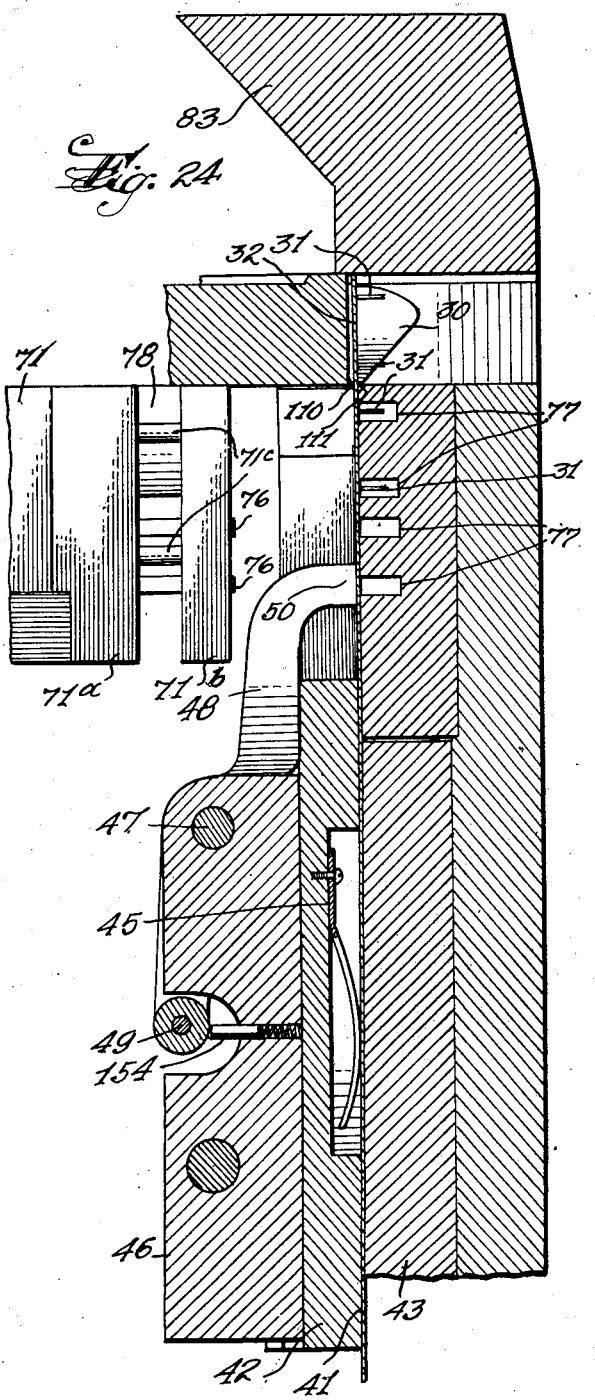
INVENTOR
Henry Brucker,
BY
Harry B. Rook,
ATTORNEY

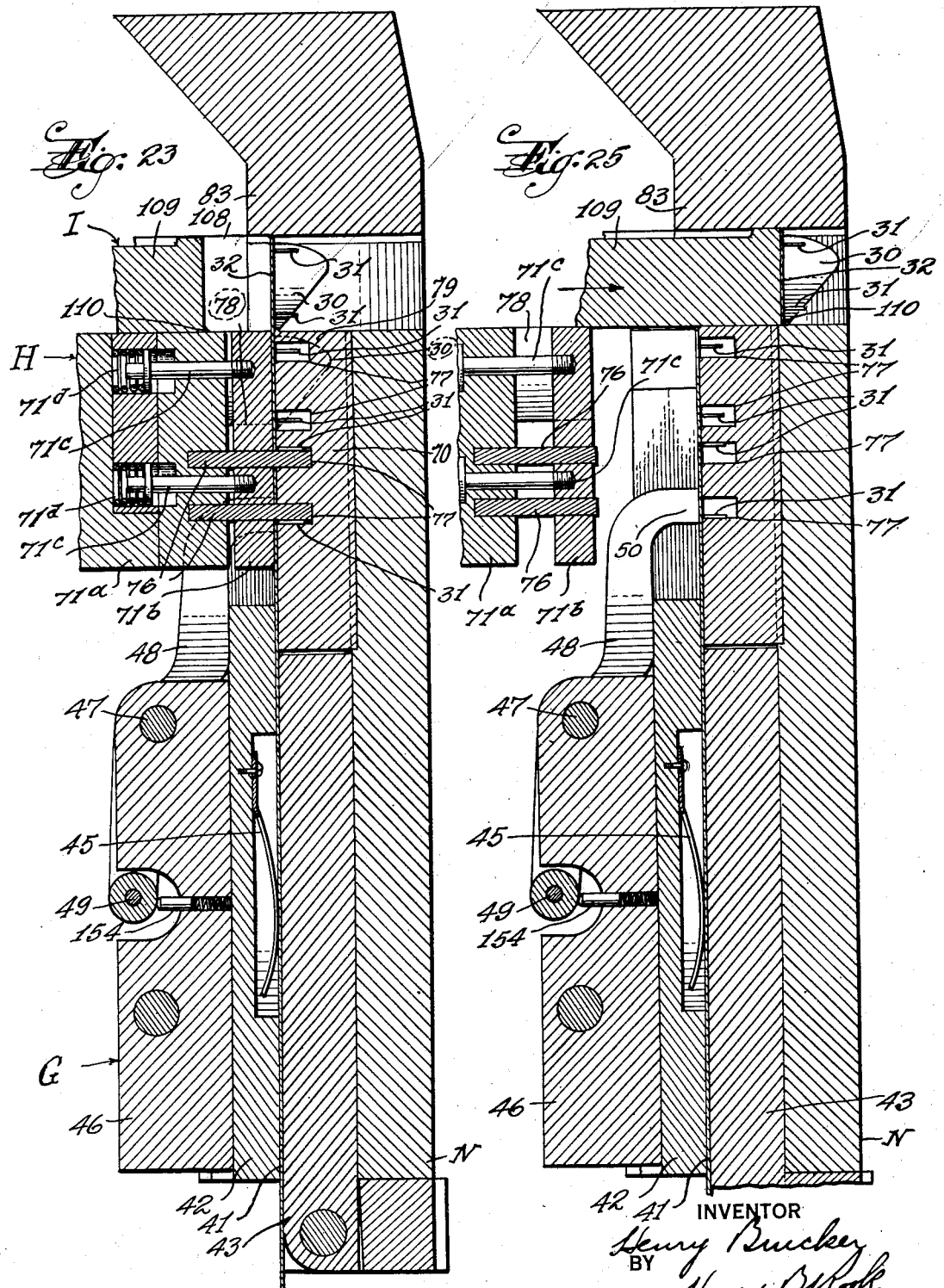

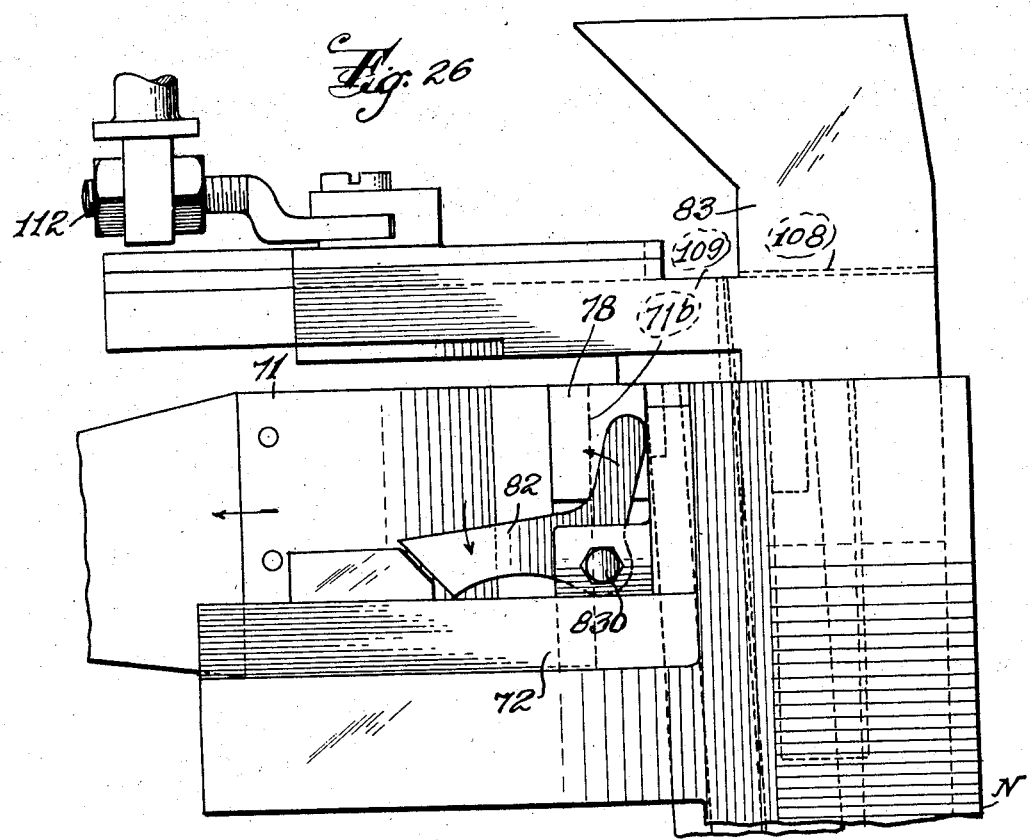
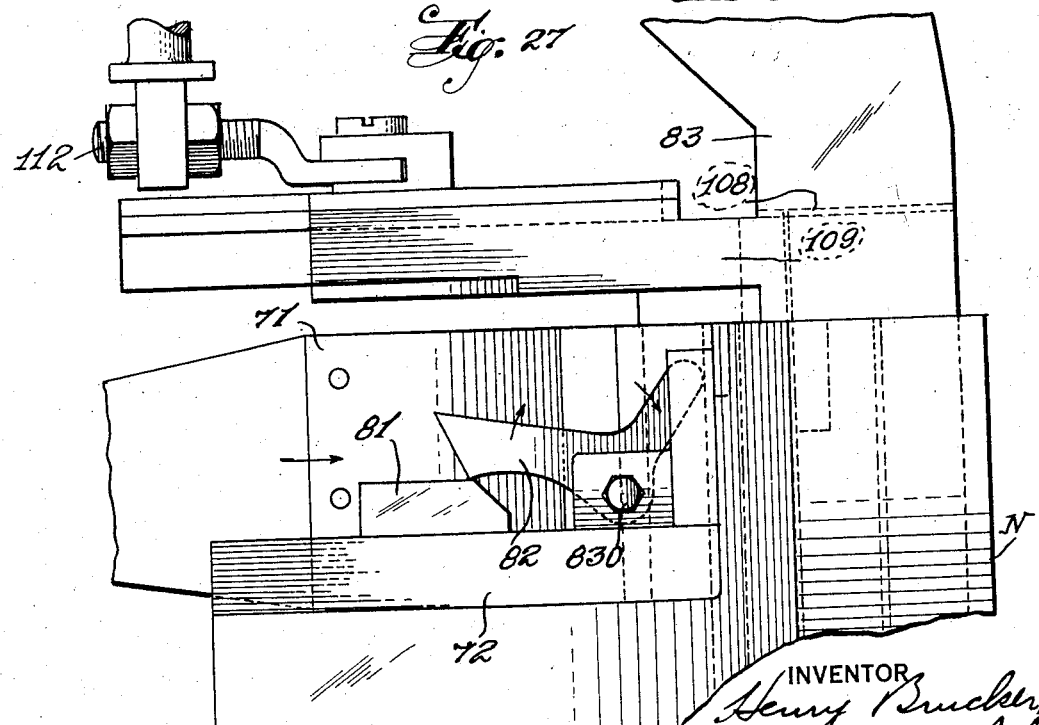

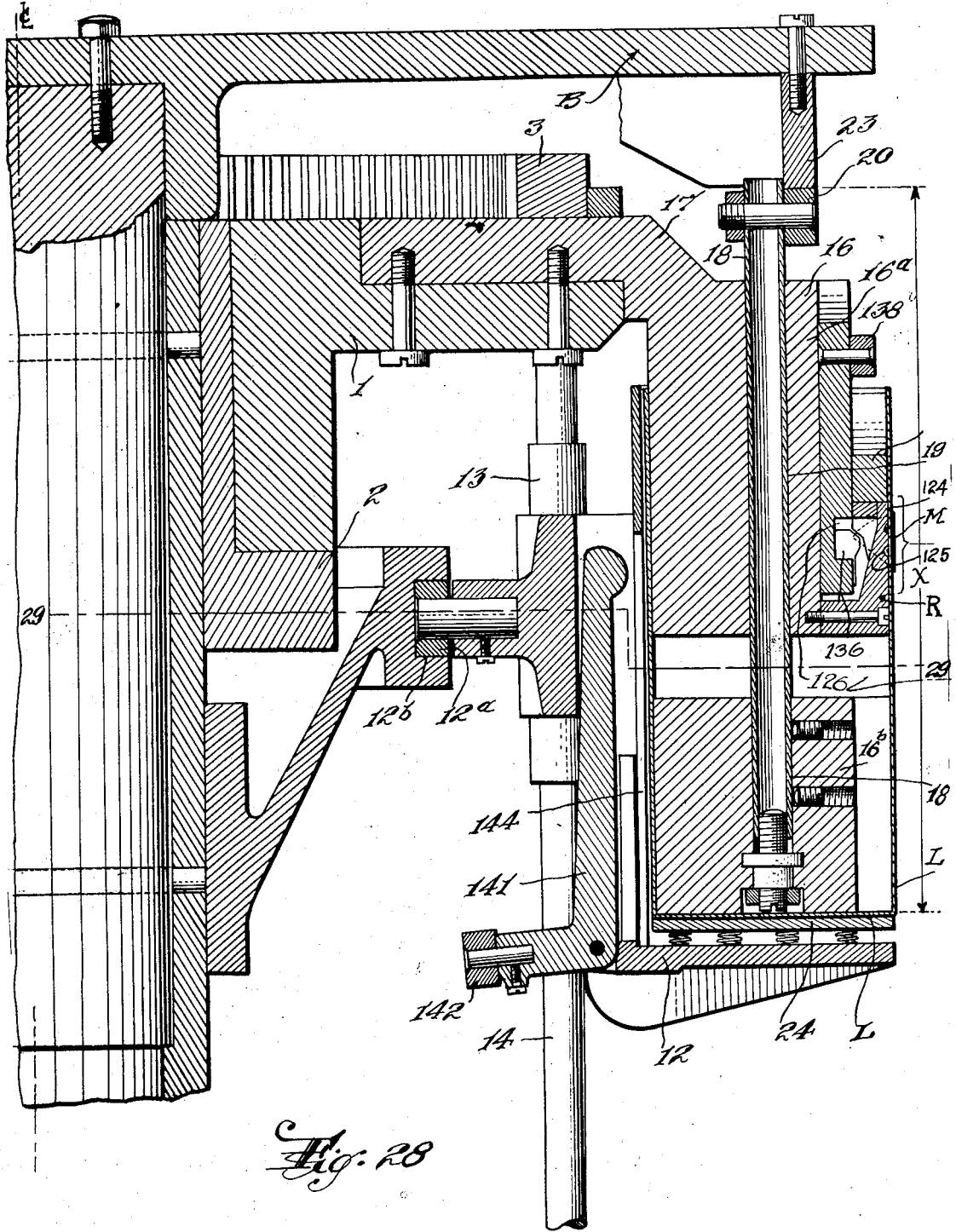

Oct. 8, 1940. H. BRUCKER 2,216,733
MACHINE FOR INSERTING POURING SPOUTS INTO CONTAINERS
Filed Oct. 5, 1937 23 Sheets-Sheet 16
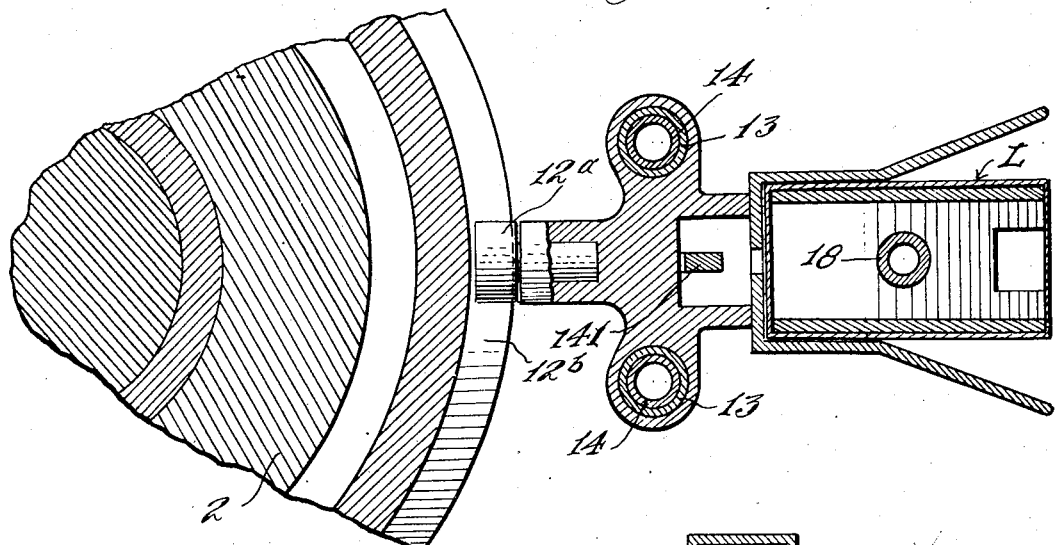
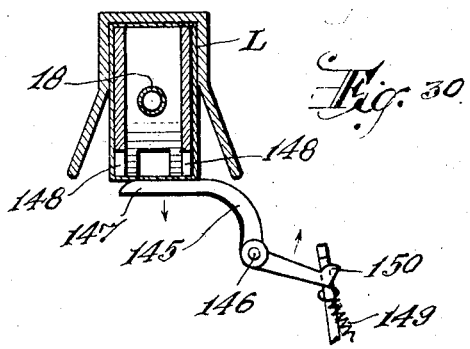
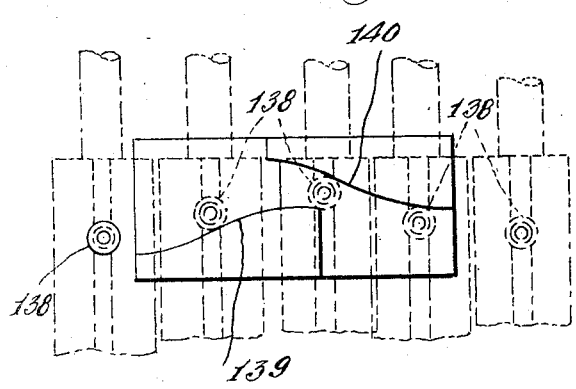
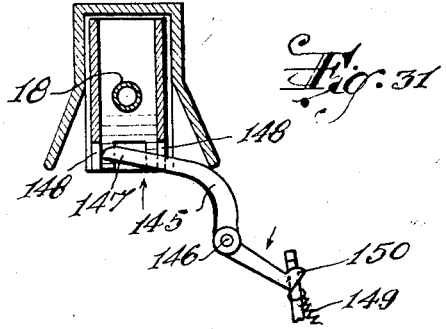

Oct. 8, 1940.  H. BRUCKER  2,216,733
MACHINE FOR INSERTING POURING SPOUTS INTO CONTAINERS
Filed Oct. 5, 1937  23 Sheets-Sheet 17
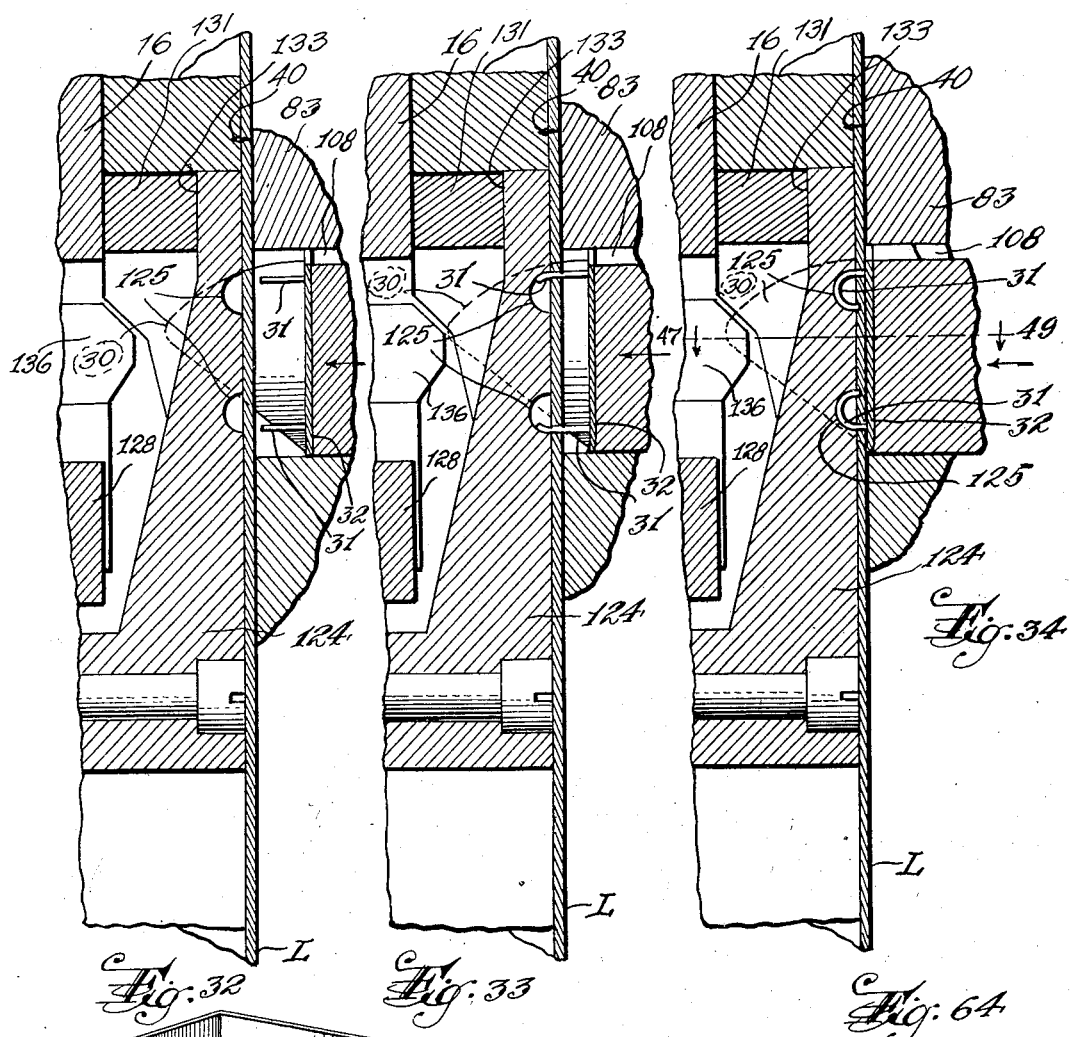
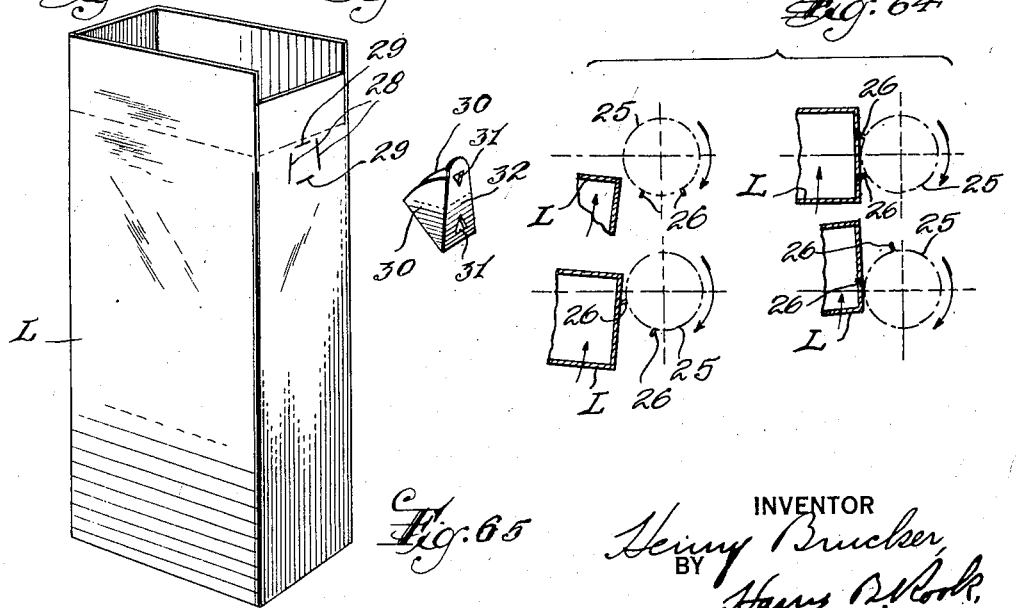

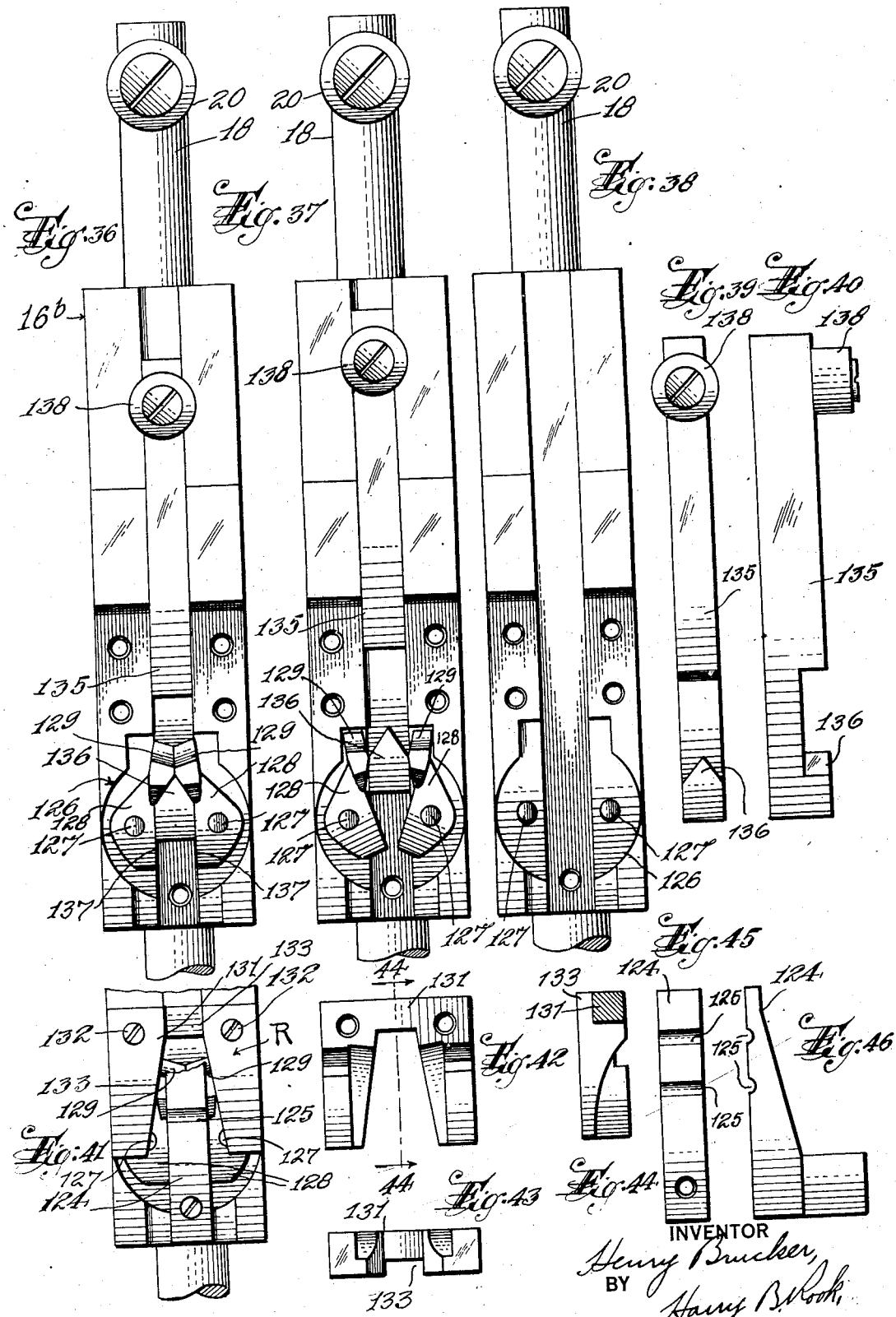

Oct. 8, 1940.  H. BRUCKER  2,216,733
MACHINE FOR INSERTING POURING SPOUTS INTO CONTAINERS
Filed Oct. 5, 1937   23 Sheets-Sheet 19
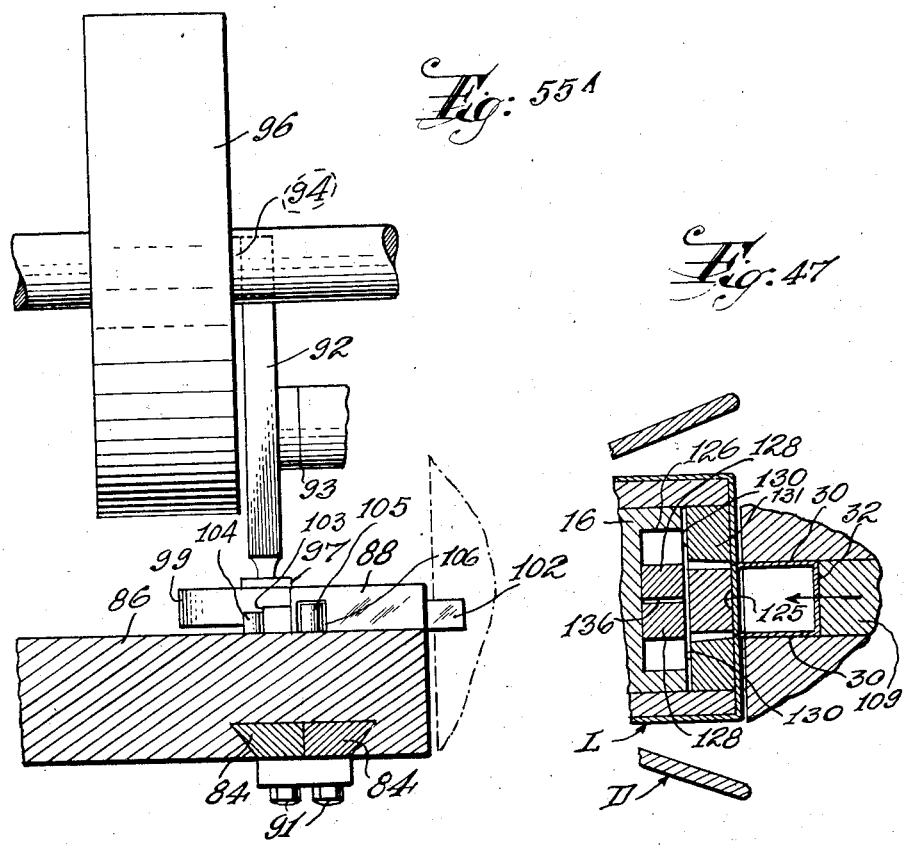
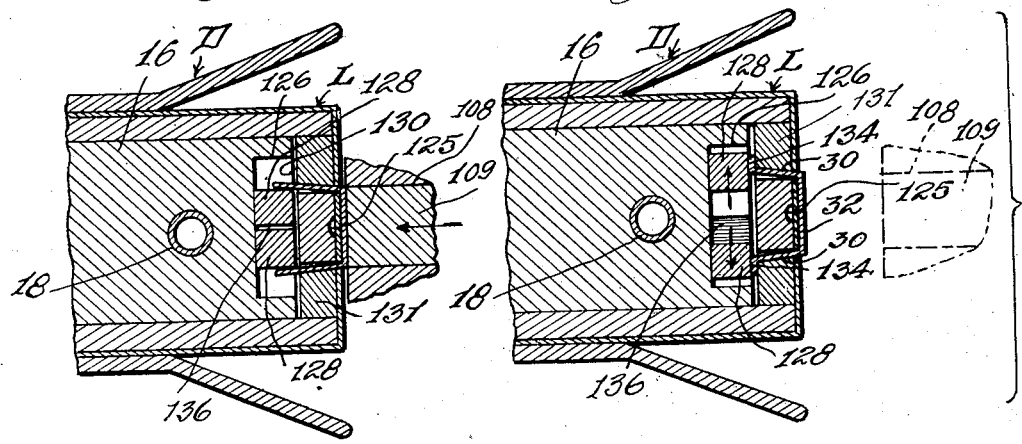

Oct. 8, 1940.      H. BRUCKER      2,216,733
MACHINE FOR INSERTING POURING SPOUTS INTO CONTAINERS
Filed Oct. 5, 1937      23 Sheets-Sheet 20
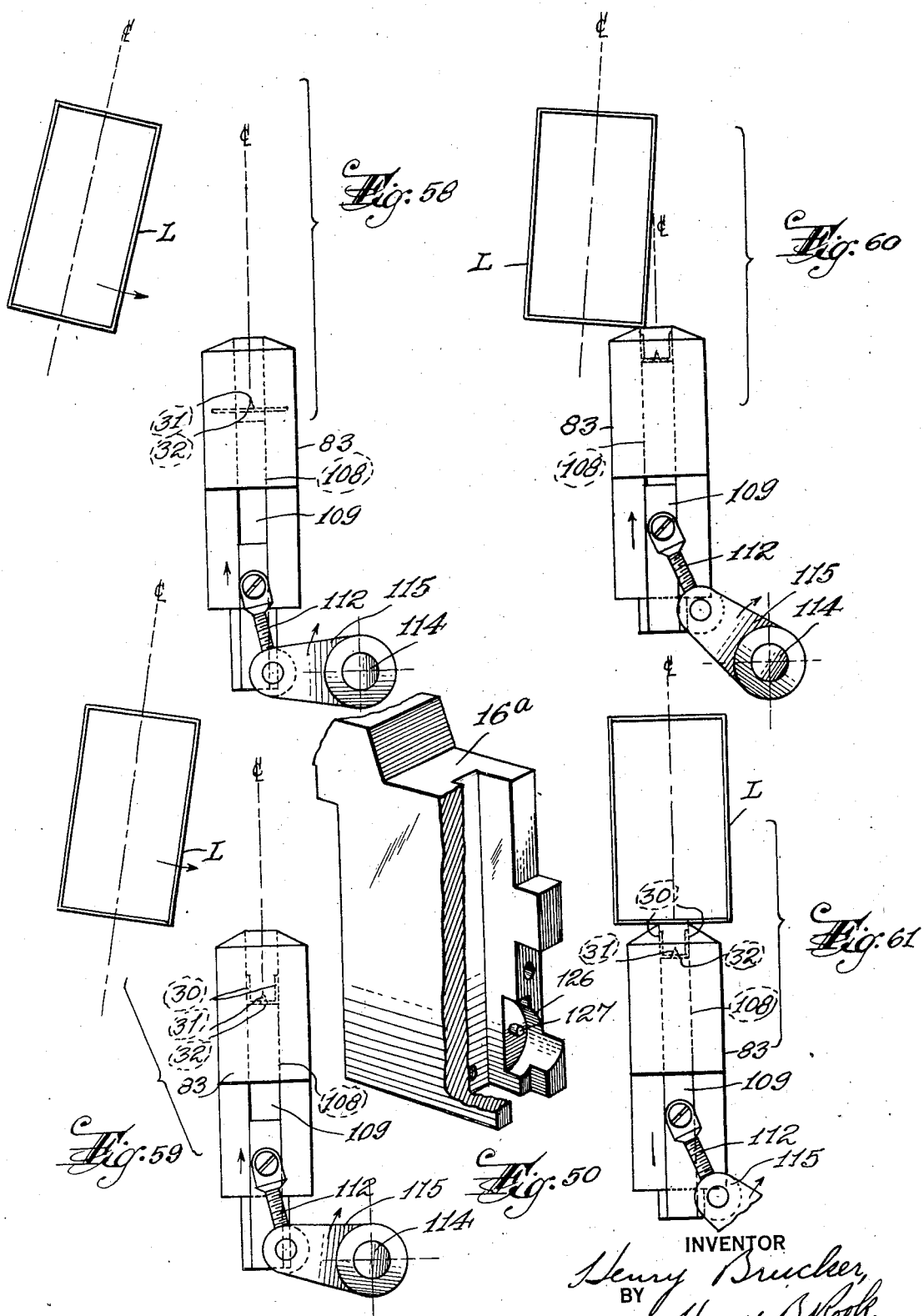

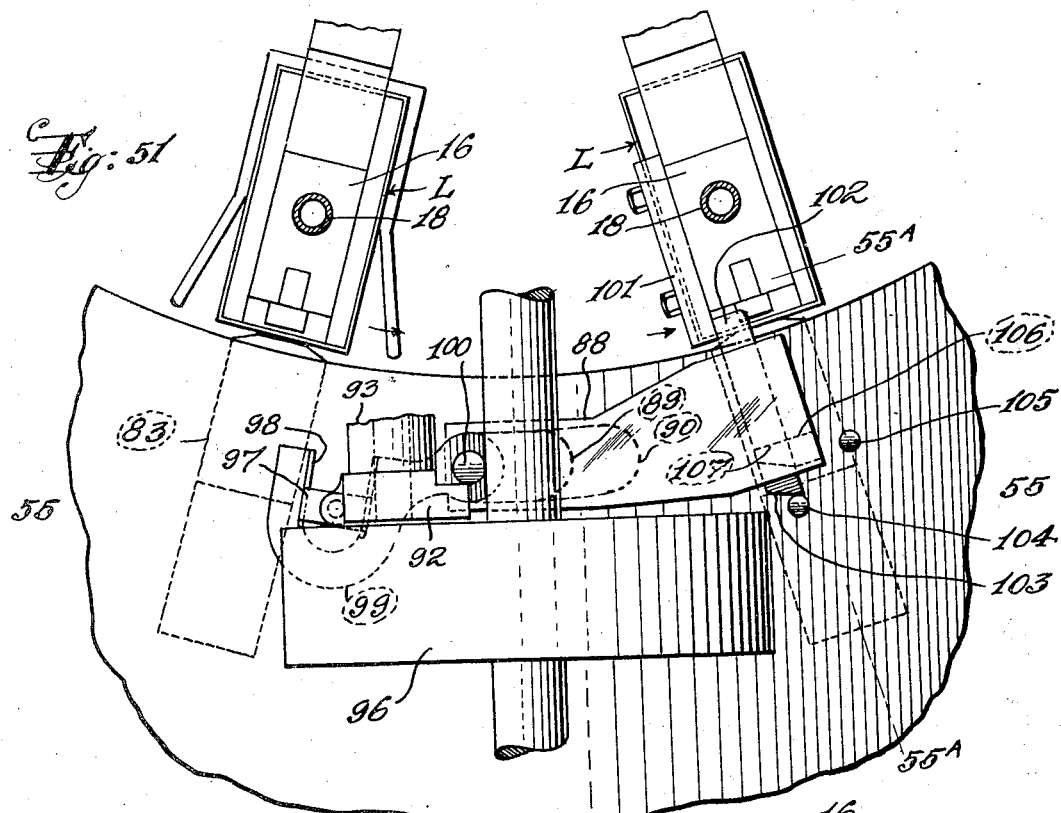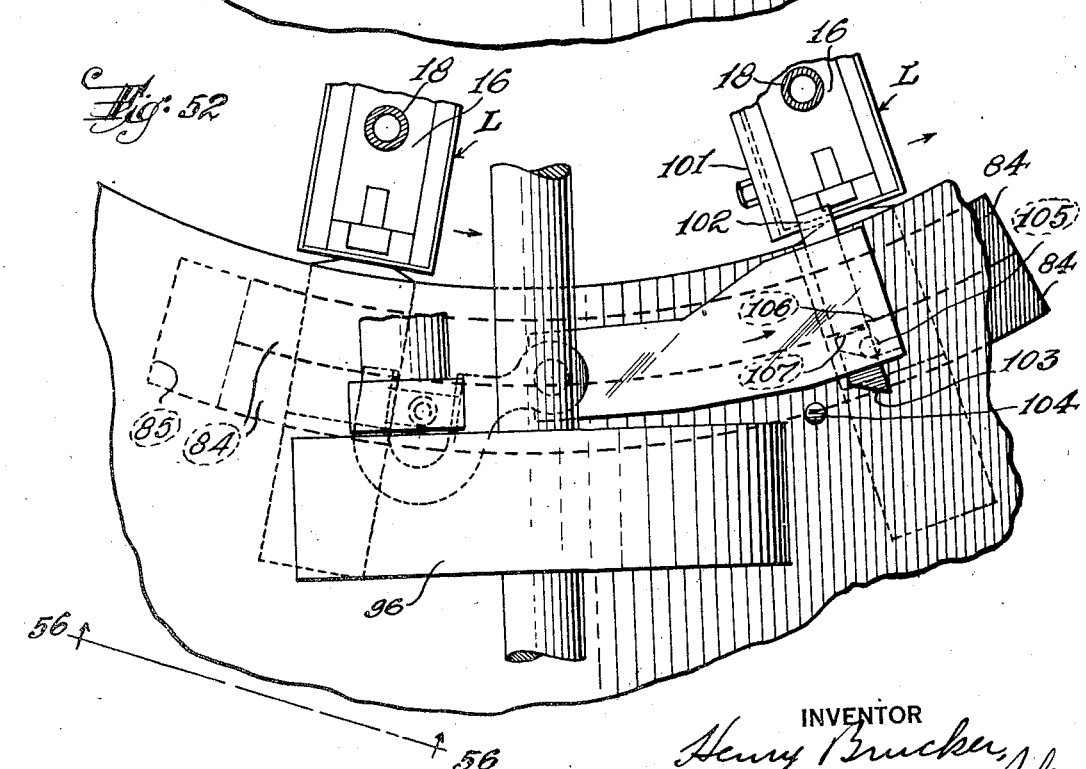

Oct. 8, 1940.   H. BRUCKER   2,216,733
MACHINE FOR INSERTING POURING SPOUTS INTO CONTAINERS
Filed Oct. 5, 1937   23 Sheets-Sheet 22

INVENTOR
Henry Brucker,
BY
Harry B. Rook,
ATTORNEY

Oct. 8, 1940.   H. BRUCKER   2,216,733
MACHINE FOR INSERTING POURING SPOUTS INTO CONTAINERS
Filed Oct. 5, 1937   23 Sheets-Sheet 23
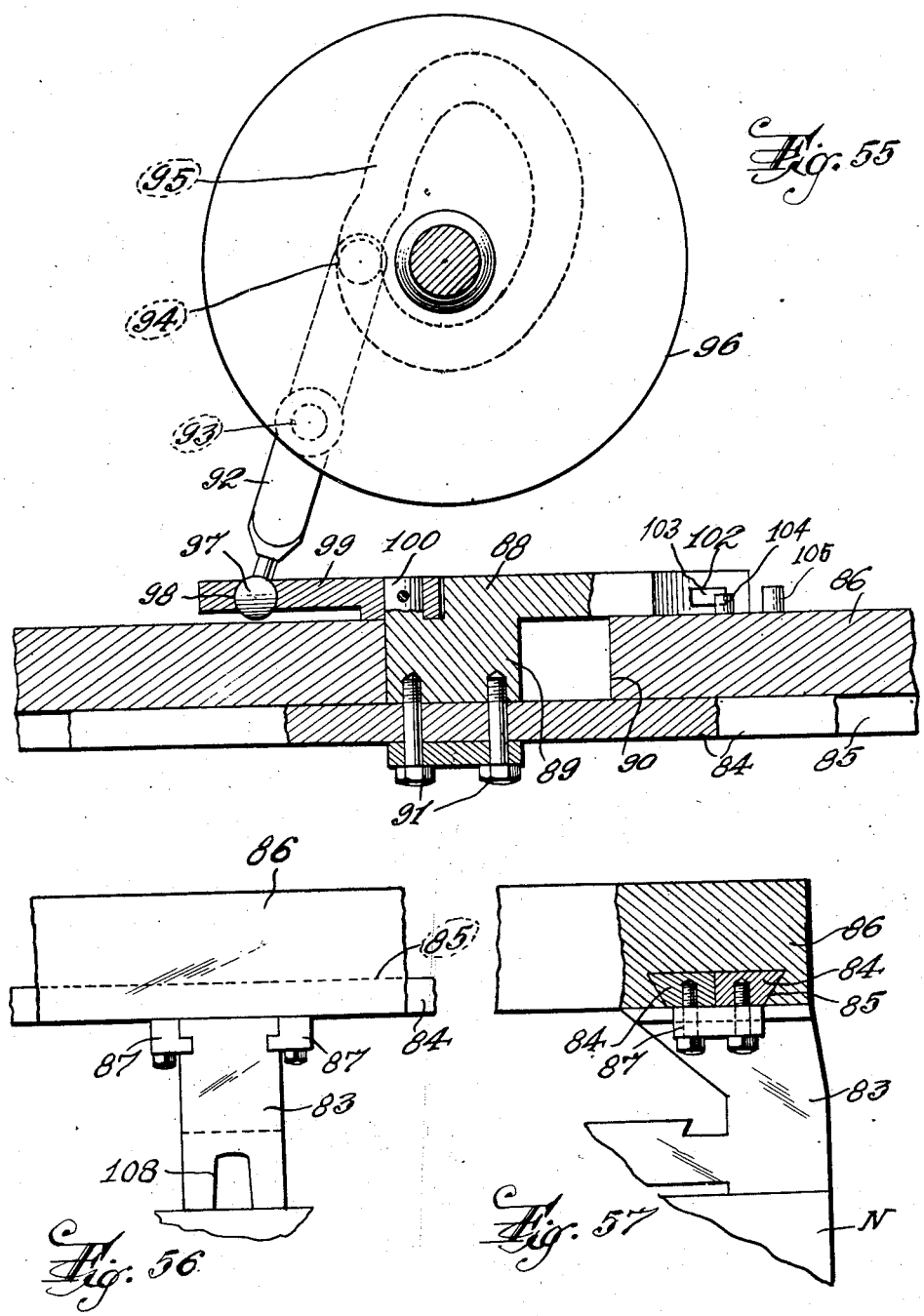
INVENTOR
Henry Brucker,
BY
Harry B. Rook,
ATTORNEY Patented Oct. 8, 1940

2,216,733

UNITED STATES PATENT OFFICE

2,216,733

MACHINE FOR INSERTING POURING SPOUTS INTO CONTAINERS

Henry Brucker, Maplewood, N. J., assignor to American Aluminum Ware Co., Newark, N. J., a corporation of New Jersey Application October 5, 1937, Serial No. 167,359

34 Claims. (Cl. 113—1)

This invention relates particularly to the manufacture of containers having pouring spouts therein of the nature shown and described in United States Patents No. 1,966,284 and No. 2,011,434 granted to Henry Brucker on July 10, 1934, and August 13, 1935, respectively, although the machine of the invention may be utilized for inserting other types of pouring spouts into other types of containers.

The combined container and pouring spout shown in those two patents includes a container of tearable material one wall of which has slits or scores partially outlining a pouring opening, and a pouring spout generally formed of sheet metal and including a body portion overlying the outside of said wall and having sector-shaped wings concentric with one end of the spout inserted through the slits in the wall of the container, the body portion of the spout being secured to the wall between said slits by prongs stamped from the body portion, penetrating the wall and clinched over the inner side thereof. The present invention relates particularly to a machine for inserting the pouring spouts into the slits in the wall of the container and securing the spouts to the wall.

One object of the invention is to provide a machine of this character wherein the preformed containers may be inserted into the machine successively at one station and moved progressively past other stations where the slits or scorings are formed in the container, the spouts are inserted through the slits, and the prongs of the spouts are clinched in the wall of the container, and thereafter the containers with the associated spouts are discharged from the machine in succession at another station. The machine contemplates rapid and automatic assembly of the containers and pouring spouts with a minimum of manual attention and at low cost.

Another object of the invention is to provide such a machine whereby at one station the spouts in partially completed blank form are fed successively, the blanks are bent to form the sector-shaped wings, the prongs are stamped up from the body portions of the spouts, and the containers are fed past said station, the completed spouts being inserted into and secured in the walls of the containers as the containers move past said station.

A further object of the invention is to provide in such a machine novel and improved means for moving the completed spout synchronously with the movement of the container and inserting the spout into the wall of the container during such movement, whereby the machine shall be simple and reliable in construction and rapid in operation.

Another object is to provide in such a machine a novel and improved construction and combination of parts whereby the partially completed spout blanks are fed in a continuous strip with a step-by-step motion, and the blanks are bent to form the wings at one step, the prongs are formed in the body portion at another step, and each spout is severed from the strip at another step. This means provides a simpler and more rapid formation and insertion of the pouring spouts than would be possible if the spouts were completely and separately formed and individually fed to and inserted into the wall of the container.

Another object of the invention is to provide a combination of a plurality of gangs of spout blank feeding, forming and inserting mechanisms and means for simultaneously operating all of the gangs so as to insert spouts into a plurality of containers at the same time, thereby to enable rapid production of combined containers and spouts.

The pouring spouts generally include an ear or lug at the inner end of each of the sector-shaped wings to limit swinging movement of the spout out of the container into open and pouring position, and another object of the invention is to provide novel and improved means for bending the edges of the wings of the spouts to form such lugs or ears after the spouts have been inserted into their respective containers.

The pressure exerted during insertion of the pouring spouts through the wall of the container, the clinching of the prongs of the pouring spout in the wall of the container, and the formation of said ears or lugs on the wings, require that the container and spout be firmly supported during the respective operations. Therefore, another object of the invention is to provide a novel and improved support or carrier for the container, whereby the container shall be transported by said carrier from the charging station, past the operating stations and to the discharging station, and the support or carrier shall be formed to serve as a mandrel or the like to cooperate with the other parts of the machine in pressing the spout through the wall of the container, clinching the prongs and forming the ears or lugs on the wings, and thereby insure against crushing or deformation of the container.

Further objects are to provide a container support or carrier of this character which shall embody novel and improved features of construction including two cooperating sections to receive and hold the container between them, one of the sections receiving the container within itself and the other section being in the form of a mandrel inserted into the container, and the container being firmly clamped between the two sections; and to provide novel and improved means for relatively actuating said sections to receive and release the container automatically at the charging and discharging stations, respectively.

A still further object of the invention is to provide in a machine of the character described, novel and improved means for preventing feeding of the spouts in the absence of containers to receive the spouts, so as to prevent jamming or other injury to the parts of the machine.

Other objects are to provide novel and improved simple, reliable and durable means for feeding the spout blank strips, for forming the prongs in the spouts and bending the spouts to form the wings, and for cutting the completed spouts from the blank strips and inserting the spouts into the containers; and to obtain other advantages and results as will appear from the following description when read in conjunction with the accompanying drawings wherein Figure 1 is a perspective view of a machine embodying the invention, portions of the pedestal or support being omitted.

Figure 3 is a like view showing the machine at a position approximately at 90° to the position shown in Figure 2.

Figure 4 is a fragmentary perspective view of of the top of the machine.

Figure 5 is an enlarged fragmentary plan view of the top of the machine with portions omitted for clearness in illustration.

Figure 6 is a fragmentary side elevation on an enlarged scale of the container carriage.

Figure 7 is a similar view on a still larger scale showing the details of the carriers on the carriage.

Figure 8 is an enlarged fragmentary side elevation of the spout feeding, spout forming and spout inserting mechanisms corresponding approximately to Figure 3 with parts omitted for clearness in illustration.

Figures 9 and 10 are respectively a fragmentary top plan view and a fragmentary perspective view of two of the parts shown in Figure 8.

Figure 13 is a fragmentary side elevation of the spout feeding mechanism, spout forming mechanism and spout inserting mechanism illustrated in Figure 8.

Figure 14 is a fragmentary side elevation of the container slitting or scoring knives shown on an enlarged scale.

Figure 15 is an enlarged front elevation of one of the spout feeding mechanisms and forming mechanisms.

Figure 1:
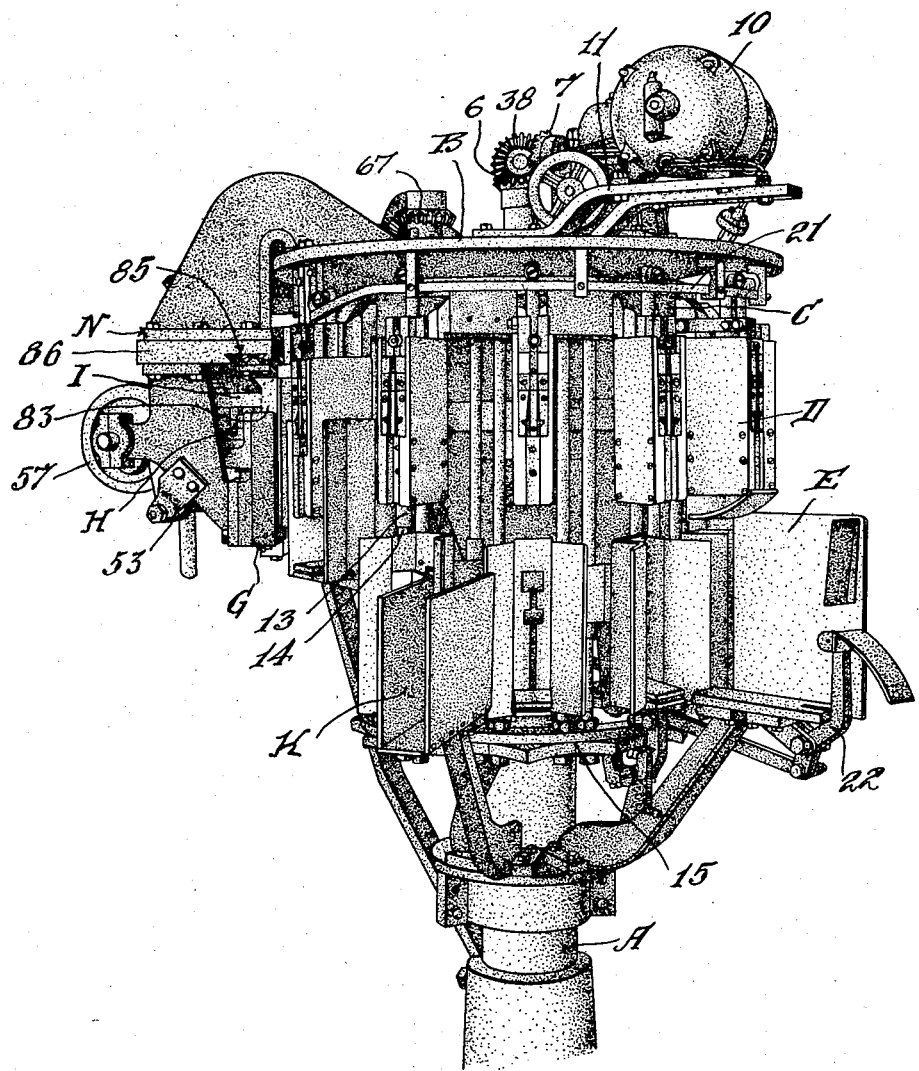

Figures 16, 17 and 18 are horizontal sectional views taken on the respective lines 16—16, 17—17 and 18—18 of Figure 15.

Figure 19 is a bottom plan view of the mechanism shown in Figure 15.

Figures 20 and 21 are vertical sectional views on the line 20—21 of Figure 15 showing successive steps in feeding of the spout blank strip.

Figures 22 and 23 are similar views showing successive steps in the forming of the spouts.

Figures 24 and 25 are like views showing successive steps in severing the formed spout from the blank strip and moving it to the respective container.

Figures 26 and 27 are fragmentary side elevations on an enlarged scale of the mechanism for clamping and releasing the blank strip during the spout forming and feeding operations respectively.

Figure 28 is an enlarged fragmentary vertical sectional view taken approximately on the line 28—28 of Figure 6.

Figure 29 is a horizontal sectional view on the line 29—29 of Figure 28.

Figures 30 and 31 are fragmentary horizontal sectional views through one of the container carriers showing the operation of the mechanism for preventing feeding of the spout blank in the absence of a container in the carrier.

Figures 32, 33 and 34 are enlarged fragmentary vertical sectional views through the mandrel section of the carrier showing the anvil for clinching the prongs in the container wall.

Figure 35 is a schematic view of the cams for operating the mechanism for forming the stop lugs on the spouts.

Figures 36 and 37 are enlarged front elevations of a portion of the mandrel section carrier showing the stop lug forming mechanism and showing successive steps in the operation thereof, the die plates being removed.

Figure 38 is a similar view showing the lug forming dogs omitted.

Figures 39 and 40 are respectively detached front elevations and side elevations of the dog operating cam slide.

Figure 41 is a fragmentary front elevation of the lower end of the mandrel section shown in Figure 36 with the die plates applied.

Figures 42 and 43 are respectively a rear elevation and a bottom plan view of the die plate for cooperating with the dogs to form the stop lugs.

Figure 44 is a vertical longitudinal sectional view on the line 44—44 of Figure 42.

Figures 45 and 46 are respectively a front elevation and a side elevation of the anvil die plate for clinching the prongs on the spouts.

Figures 47 to 49 inclusive are horizontal sectional views on the line 47—49 of Figure 34, showing the successive steps in inserting the spout into the container and forming the stop lugs on the spout.

Figure 50 is a detached perspective view on a reduced scale of the carrier section shown in Figure 38 with portions broken away.

Figures 51 to 54 inclusive are fragmentary top plan views of the mechanism for oscillating the spout holders during insertion of the pouring spouts into the containers.

Figure 55 is a vertical sectional view approximately on the line 55—55 of Figure 51.

Figure 55A is a transverse sectional view on the line 55A—55A of Figure 51.

Figure 56 is a fragmentary front elevation of one of the spout holders and its mounting viewed from the line 56—56 of Figure 52.

Figure 57 is a fragmentary side elevation of the mechanism shown in Figure 56.

Figures 58 to 63 inclusive are schematic plan views showing the successive steps in oscillation and reciprocation of the spout inserting ram during insertion of a spout into a container.

Figure 64 is a composite schematic view showing the successive steps in the slitting or scoring of the container, and Figure 65 is a composite perspective view of one of the containers and a spout to be inserted.

Specifically describing the illustrated embodiment of the invention, the machine includes a suitable support which is shown in the form of a pedestal A having a base (not shown) and a top plate B. Supported on the pedestal is a carriage C for supporting and moving containers into which pouring spouts are to be inserted, the carriage being shown as rotatable about a vertical axis and having an individual carrier D for each container which is moved in a predetermined path from a container inserting or charging station E, past a device F for slitting, scoring or otherwise conditioning a wall of the container to receive a pouring spout, then past a spout blank feeding mechanism G, spout forming mechanism H and spout inserting mechanism I, then to a container discharging station K.

As shown, the carriage C comprises a ring 1 which is rotatably mounted on a bearing 2 adjacent the upper end of the pedestal A, and this ring is shown as driven through a ring gear 3 secured to the ring 1 which is driven by a pinion 4 mounted on a stub shaft 5 which has a bevel pinion 6 above the top plate B meshing with another bevel pinion 7 which is driven through speed reducing mechanism 8 and a belt and pulley connection 9 from electric motor or other prime mover 10 which is mounted on the bracket 11 on the top plate.

A plurality of the carriers D are mounted on the carriage 1 in equi-distantly spaced relation circumferentially thereof. Each carrier includes a main section 12 to receive a container L and a second section 16 to be inserted into the container in the nature of a mandrel and clamp the container between itself and the main section 12. The section 12 has an open front and open top to permit insertion of the container, and is vertically slidably mounted by bearing tubes 13 on guide rods 14 which are connected respectively to the top ring 1 and a second or bottom ring 15. The section 12 is vertically moved by a cam roller 12ª which rides in a cam groove 12ᵇ (see Figure 28).

The section 16 includes two parts 16ª and 16ᵇ, the former being fixedly mounted as by a bracket 17 on the top ring 1, and the section 16ᵇ has a tube or rod 18 extending upwardly therefrom and slidable through an opening 19 in the section 16, the upper end of the tube or rod carrying a follower roller 20 to engage cams to be hereinafter described.

In operation of the mechanism so far described, upon starting of the motor 10, the carriers D are rotated successively past the container charging station E. The containers L having their tops open as shown in Figure 65, are successively supplied to the charging station E. As the carriers approach the charging station, the main section 12 of each carrier is lowered by the roller 12ª and cam 12ᵇ into substantial alinement with the charging station as shown in Figure 1, and the lower part 16ᵇ of the mandrel section 16 is raised by the roller 20 riding on a cam track 21.

Figure 2:
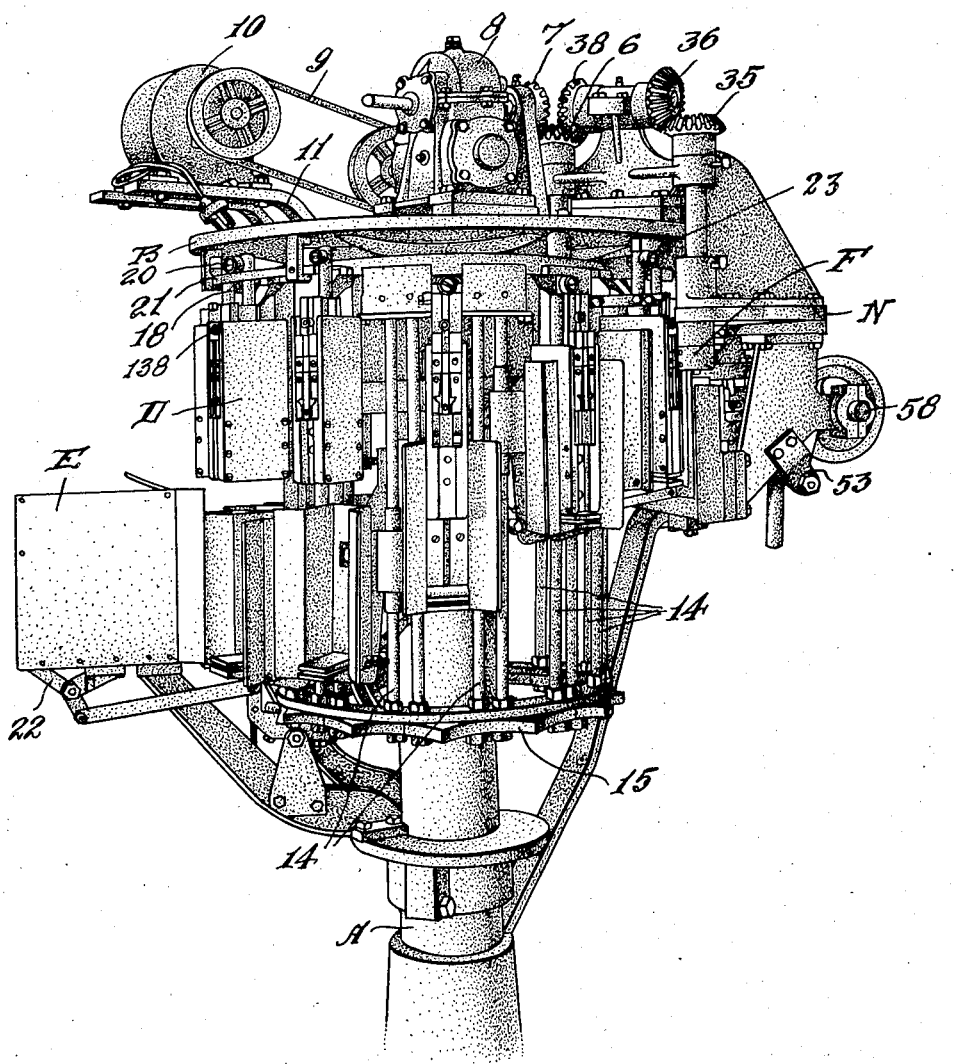
Figure 2 is a similar view looking at the machine from a position at approximately 180° to that of Figure 1.

A suitable automatic mechanism 22 may be provided for moving the containers into the main sections 12 with a snap action. Thereupon the carrier continues to rotate, the main section 12 is elevated by the cam 12ᵇ and roller 12ª so that the container is slipped over the mandrel section 16 as shown in Figure 28. Thereupon the lower part 16ᵇ of the mandrel sections drops upon leaving cam 21 and thereafter is raised by section 12 and then held against upward movement by the roller 20 riding over a cam 23 so as to firmly clamp the container between the main section 12 and the mandrel section 16 (see Figure 2). Preferably the bottom of the main section 12 has a yielding plate 24 for supporting the container, and this yielding plate in conjunction with the part 16ᵇ of the mandrel section compensates for container walls of different thicknesses so as to insure that when a container is clamped in the carrier, the distance between the bottom of the mandrel section and a spout receiving portion M of the container shall be in predetermined uniform relation to each other, or so that the spout receiving portion M of the container shall be accurately located with respect to the spout wing and prong receiving parts (to be described) carried by the section 16, regardless of the thickness of the bottom wall of the container.

The container being so clamped in the carrier, the carrier continues to rotate past the mechanism F for slitting, scoring or otherwise conditioning a portion of the exposed wall of the container. As shown, this mechanism F includes a roller 25 having two approximately vertically disposed blades 26 and two horizontally disposed blades 27 on its periphery. The blades 26 and 27 are intended to form respectively the slits 28 and 29 in the container wall to receive respectively wings or flanges 30 on a pouring spout and prongs 31 on the body portion 32 of the pouring spout for securing the spout in the container wall. The roller 25 is rotated at approximately the same peripheral speed as the movement of the container by the carriage by a countershaft 33 journaled in a bearing 34 on the top plate and carrying a pinion 35 meshing with a pinion 36 on a jack shaft 37 which has another pinion 38 meshing with the pinion 6 on the stud shaft 5. Preferably the mandrel section 16 of the carrier has grooves 39 and 40 to aline with the respective blades 26 and 27 as the container is moved against the roller 25 so as to effectually slit or score the wall of the container.

After the container has been operated upon by the mechanism F, the carrier moves the container to the spout feeding, forming and inserting mechanism G, H and I. During this movement, the lower section 12 of the carrier and the lower part 16ᵇ of the mandrel section are lowered slightly together by cooperation of cam surface 23ª of cam 23 and a corresponding portion of the cam groove 12ᵇ, so as to lower the container relative to the fixed upper part 16ª of the mandrel section and locate the slits in the container opposite a spout receiving portion R of the upper part 16ª to be hereinafter described (see Figure 6).

To increase the speed of operation of the machine, two series of spout forming, feeding and inserting mechanisms are shown, and inasmuch as each series is substantially identical to the other, we shall describe only one. The two series are mounted on an auxiliary frame or bracket N which is suspended from the top plate B at one side of the carriage. Each series includes a guideway 41 for a continuous strip O of spout blanks. As shown, this strip of spout blanks includes a plurality of flat blanks connected in end to end relation, each blank being shaped to provide the body portion and side wings of a finished spout (see Figures 18 and 20). The guideway 41 is shown as formed between two plates 42 and 43, the latter of which is hingedly connected at 44 on a horizontal axis on the auxiliary frame N. Preferably a flat spring 45 is provided in a recess between the plates 42 and 43 for yieldingly frictionally holding the blank strip against movement.

Feeding mechanism for the blank strip includes a block 46 slidably mounted in the outer plate 42 and having pivotally connected thereto at 47, a pair of feed dogs 48 which are connected to move together by a cross rod 49 at their lower ends. The upper ends of the dogs have inturned fingers 50 to engage behind the edges of the respective blanks of the blank strip O as shown in Figures 15 and 20. The block 46 and dogs 48 are reciprocated with a step-by-step movement to feed the blank strip one blank at a time, by a lever 51 having one end fixedly connected to a shaft 52 which is journaled in a bracket 53 on the auxiliary frame N. The other end of the lever 51 has a pin and slot connection 54 with the block 46. The lever 51 is oscillated by a crank arm 55 on the shaft 52 having one end riding in a cam groove 56 in one side of a cam wheel 57 carried by a shaft 58 journaled in bearings 59. It will be noted that there is one shaft 58 for each series of spout feeding, forming and inserting mechanisms, and as shown in Figure 3, each shaft 58 has a bevel pinion 60 which meshes with a common bevel pinion 61 on a countershaft 62 journaled on the top plate B and having another bevel pinion 63 meshing with a bevel pinion 64 on a stub shaft 65 also journaled on the top plate. The stub shaft 65 carries a pinion 66 meshing with a pinion 67 on a jack shaft 68 which carries a gear 69 meshing with the ring gear 3. With this construction, the two shafts 58 are driven through the ring gear 3 from the motor 10, and through the cam 57, crank 55 and lever 51, the feed dogs 48 will be reciprocated step by step.

Juxtaposed to the guideway 41 adjacent the upper end thereof is the spout forming mechanism. This mechanism includes a die 70 juxtaposed to the guideway 41 at one side thereof, and a complemental movable die 71 at the opposite side of the guideway. The movable die 71 is reciprocable in a bracket 72 on the auxiliary frame N by a connecting rod 73 which has follower rollers 74 riding in identical cam grooves 75 in the cam wheel 57. The die 71 includes a main section 71ᵃ and a secondary section 71ᵇ which are relatively longitudinally movable as by mounting the section 71ᵇ on rods 71ᶜ slidable in the section 71ᵃ. The section 71ᵇ is normally influenced away or separated from the main section 71ᵃ by springs 71ᵈ.

The main section 71ᵃ carries a pair of punches 76 to cooperate with recesses 77 in the die 70 for forming the prongs 31 on the spouts, and above the punches 76 the die section 71ᵃ carries arms 78 to cooperate with a die block 79 for forming the flanges 30 of the spout as shown in Figures 15, 16 and 23.

Figure 11:
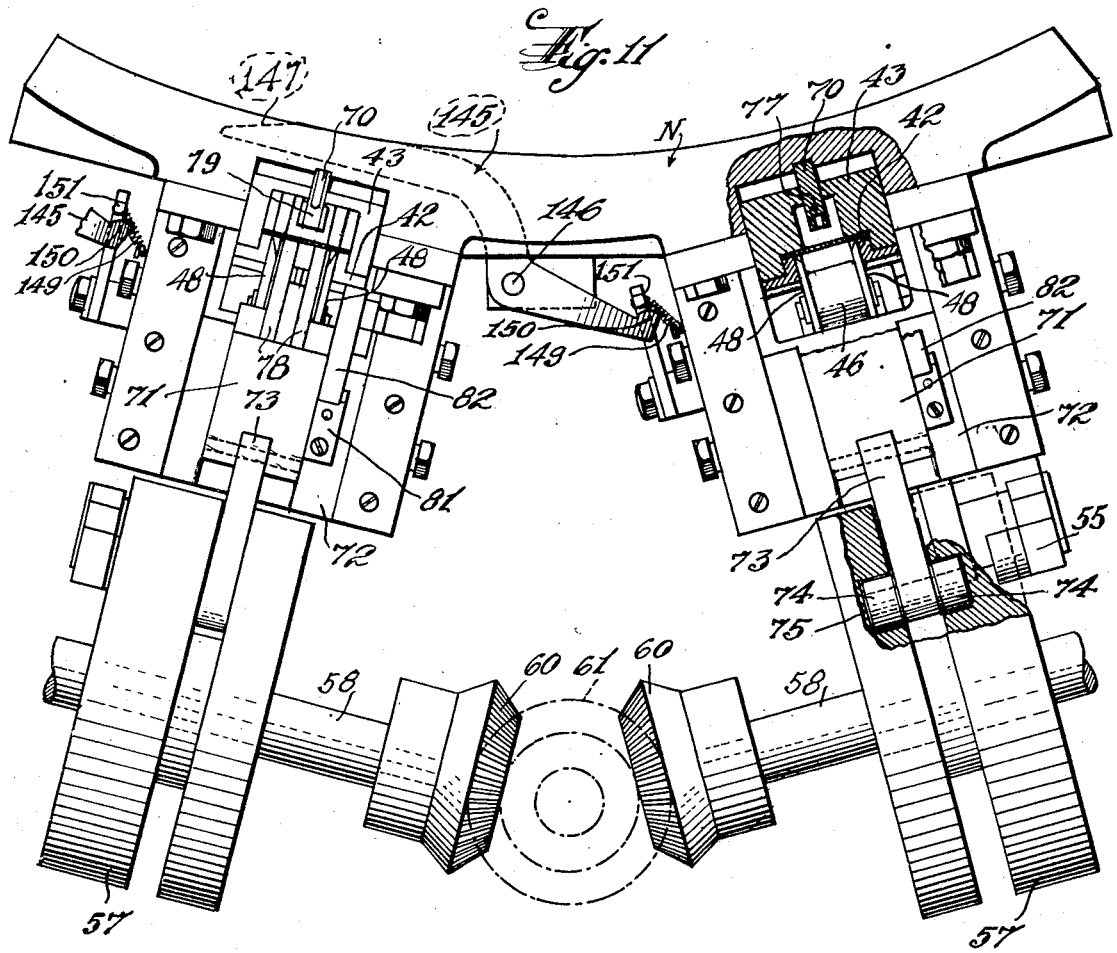
Figure 11 is a top plan view of the spout feeding and spout forming mechanisms, viewing the same from approximately the line 11—11 of Figure 8 with portions broken away and shown in section.

In operation, at the end of each step of feeding of the blank strip O, the die 71 is actuated by the cam wheel 57 and connecting rod 73 toward the complemental die 70 so as to form the prongs in the body portion of one spout blank and simultaneously form the flanges on the next preceding spout at one and the same operation as shown in Figure 23, the section 71ᵇ serving to firmly clamp the blank strip during the operation. The die 71 is then withdrawn from the die 70, the section 71ᵇ serving as a stripper. To permit feeding of the blank strip with the prongs and flanges thus formed, the plate 43 is swung outwardly to withdraw the prongs from the openings 77, as shown in Figure 20, the plate 43 being normally influenced in this direction by springs 80. The strip is then fed one step as shown in Figure 21 so as to advance the completed spout above the dies and into position to be inserted into a container. At the end of the feeding operation, and upon advance of the die 71, the plate 43 is moved in the opposite direction by engagement of a cam block 81 on the die with one end of a bell crank lever 82 which is pivotally mounted at 830 on the bracket 72 and has its other end in abutting relation with the plate 43 (see Figures 11, 26 and 27). The bell crank 82 is moved in the opposite direction under influence of the springs 80 upon withdrawal of the cam block 81 by return movement of the die 71.

Figure 53:
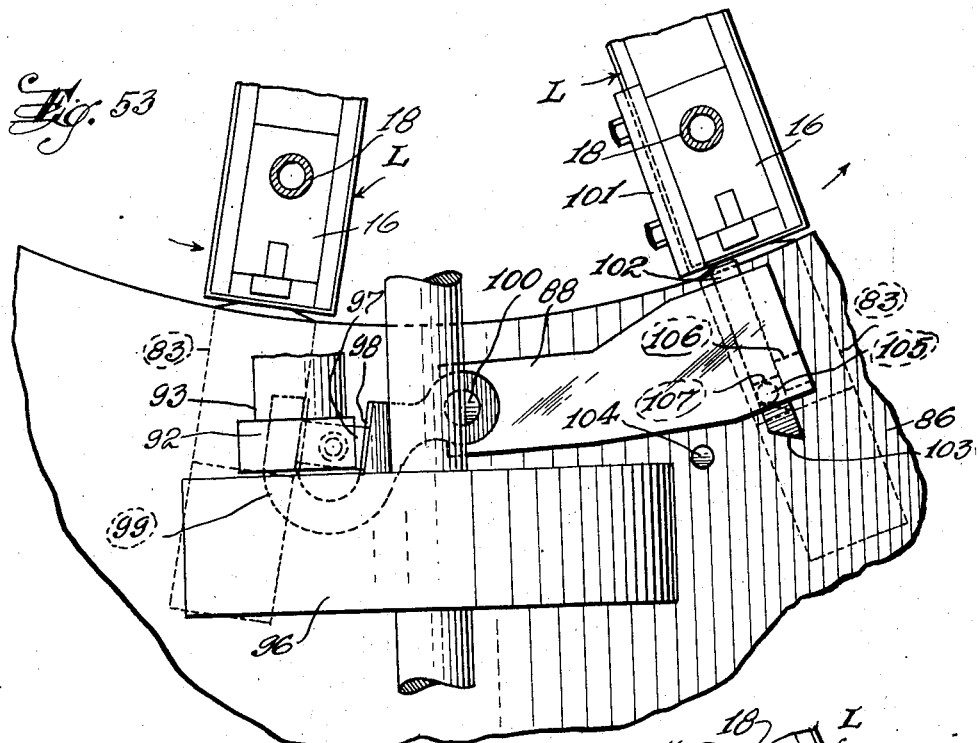
Figure 54:
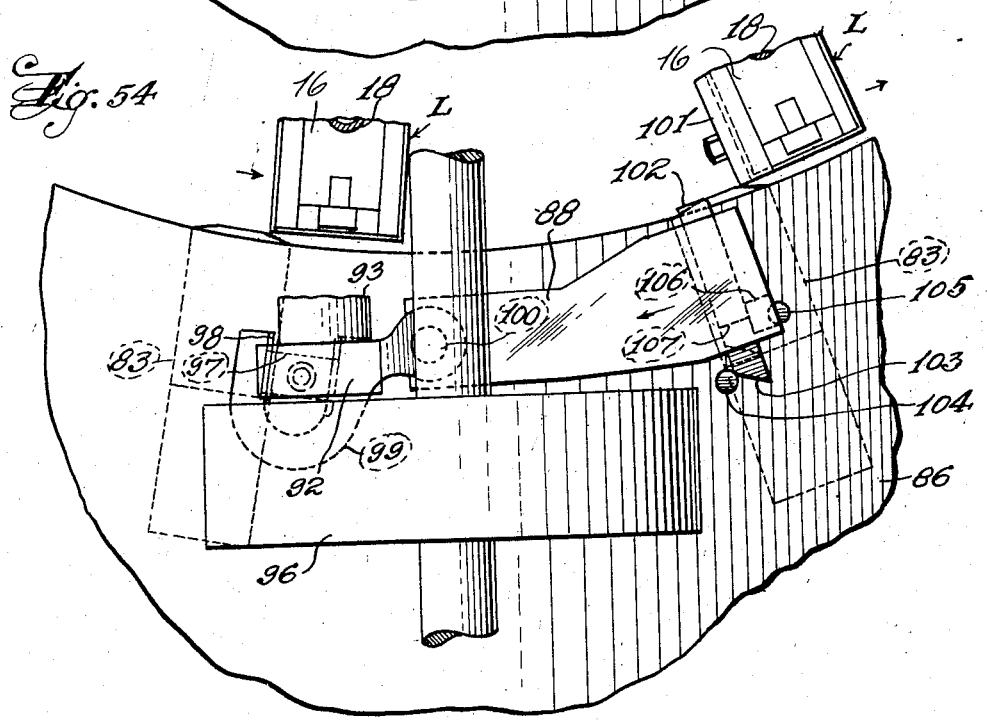

The spout inserting mechanism I is disposed above the guideway and spout forming mechanism H. This inserting mechanism includes a spout holder and carrier 83 that is movable momentarily synchronously with the carriage and juxtaposed to the carrier as the latter moves in its predetermined path. As shown, the holder is mounted on an arcuate slide 84 concentric with the path of movement of the carriers and secured in a dove tail groove 85 in a bracket plate 86 on the auxiliary frame N, the holder being clamped on the slide 84 by clips 87 (see Figures 1 and 51 to 57 inclusive). The holder is actuated by a block 88 reciprocable at the side of the bracket plate 86 opposite the guide groove 85 and having an extension 89 passing through a slot 90 in the plate 86 and connected by bolts 91 to the slide 84. The block 88 is moved in the direction of movement of the carriers D by lugs 101 on the carriers cooperating with a latch bar 102 slidably mounted in the block 88. As shown, the lugs 101 are mounted on alternate carriers and the latch 102 is successively projected into and retracted from the path of movement of the lugs so as to successively connect the block 88 to the carrier and release the block therefrom. As shown, the end of the latch bar 102 opposite that which engages the lug 101 is beveled at 103 to cooperate with a stud 104 on the plate 86 so as to project the latch 102 when the block 88 and spout holders 83 are in their initial positions as shown in Figure 51. Both spout holders 83 are connected to the slide 84 and in spaced relation circumferentially of the carriage corresponding to the spacing of the carriers D, as clearly shown in Figure 51, whereby the holders move together. In operation, as the carriers approach the respective spout holders 83, the carrier on which the lug 101 is mounted engages the latch 102 to move the holders 83 simultaneously, synchronously and concentrically with the carriers for a portion of the movement of the carriers. After the spout holders have been moved a predetermined distance, the latch 102 is retracted from the lug 101 by a stud 105 on the plate 86 which enters a slot 106 in the block and a cam slot 107 in the latch bar 102 so as to withdraw the latch bar as shown in Figure 53. Thereupon the block 88 and the holders 83 are returned to their initial positions.

The block 88 is returned or moved in the other direction by a lever 92 pivotally mounted intermediate its ends at 93 on the auxiliary frame N and having a follower roller 94 at one end riding in a cam groove 95 in a cam wheel 96 carried by the shaft 65. One end of the lever 92 has a cylindrical head 97 rotatable and slidable axially along a slot 98 in a hook 99 pivotally mounted at 100 at one end of the block 88. This connection compensates for the oscillation of the lever 92 in a single plane and the arcuate movement of the block 88 to correspond to the arcuate movement of the slide 84. The connection of the head 97 with the slot 98 is similar to that shown in Figures 9 and 10.

During the momentary movement of the spout holders with the carriers, the spouts are simultaneously inserted into the containers carried in the carriers. As shown, each spout holder has a spout receiving channel 108 disposed above the end of the guideway 41 to receive the completed spout, and a ram 109 is slidable in the channel to push the completed spout through the channel and insert the flanges and prongs of the spout through the respective slits in the wall of the container and into corresponding recesses in the spout receiving portion R of the upper part 16ᵃ of the mandrel 16 of the carrier. The ram has a cutter 110 to cooperate with the upper edge 111 of the die 70 for severing the completed spout from the blank strip O, and at the end of each step of movement the ram is advanced to sever the spout and insert it through the wall of the container.

Figure 12:
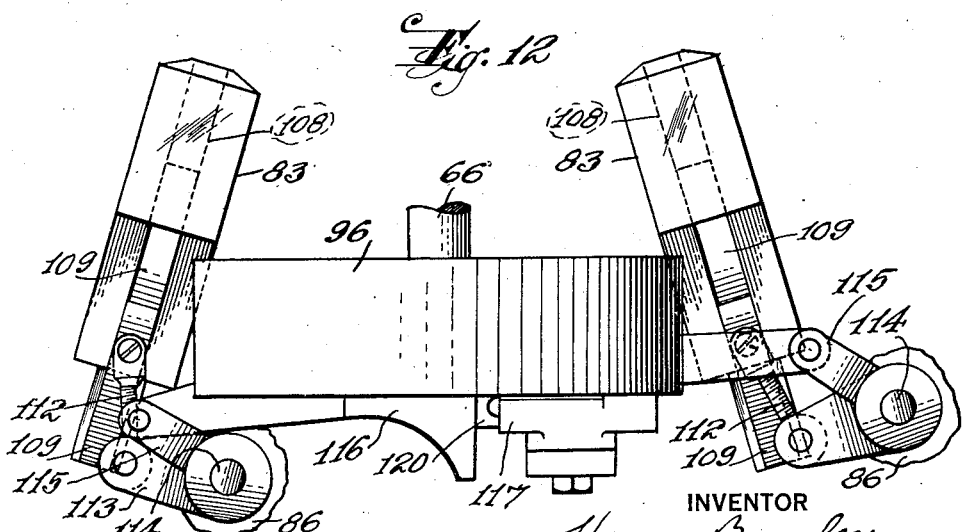
Figure 12 is a fragmentary top plan view of the oscillating mechanism for the spout inserting ram shown in Figure 8.

For reciprocating the rams of the two holders simultaneously, each ram is connected by an adjustable link 112 to a crank arm 113 on a stub shaft 114 journaled in the plate 86. The other end of the shaft 114 has a crank 115 which is connected to one end of a link 116 so that one crank arm 115 is connected to each end of the link (see Figures 8, 12 and 13). The link 116 is reciprocated by a lever 117 pivotally connected intermediate its ends at 118 on a bracket 119 on the plate 86, and one end of the lever has a cylindrical head 120 rotatable and longitudinally slidably in a slot 121 in the link. The other end of the lever has a follower roller 122 riding in a cam groove 123 in the cam wheel 96.

In operation, the rams 109 are simultaneously retracted into the positions shown in Figures 20 and 21 during the feeding of a blank strip, and at the end of each step of feeding of the blank strip and simultaneously with the movement of the spout holders with the carriers, the rams are projected through the channels 108 to insert the flanges and prongs of the spout into the respective containers. During the return movement of the spout holders the rams 109 are again retracted. The sequence of movement of the ram and spout holders during the spout inserting operation is shown in Figures 58 to 63 inclusive, Figure 58 showing the beginning of the spout inserting movement of the ram, Figure 62 showing the completion of the spout inserting movement, and Figure 63 showing the retraction of the ram.

Simultaneously with the insertion of the prongs of the spout through the wall of the container the prongs are clinched over the insides of the container walls. This is accomplished by forming the section 16 of each carrier with an anvil block 124 which has grooves 125 into which the prongs are forced by the ram 109 and bent or clinched as clearly shown in Figures 32 to 34 inclusive.

After the spout has been inserted, stop ears or lugs are formed on the edges of the flanges to limit swinging movement of the spout outwardly of the container. As shown, the section 16 of each carrier has a recess 126 in which are pivotally mounted at 127 a pair of bending dogs 128 each of which has a head 129 at one end to cooperate with an inner die surface 130 on a die plate 131 removably secured on the carrier section by screws 132. The die plate 131 has a recess 133 into which projects the anvil block 124 with the sides of the anvil block and the sides of the recess in spaced relation to provide a clearance for the insertion of the spout wings as shown in Figures 41 and 47 to 49 inclusive.

The heads 129 of the dogs 128 are normally in the position shown in Figures 36 and 48 so that as the spout wings are inserted they straddle the heads 129 as shown in Figure 48. Thereupon the dogs are swung apart as shown in Figures 37 and 49 so as to bend portions of the edges of the wings to form lugs 134 as shown in Figure 49.

For so actuating the dogs, the carrier section 16 has a cam slide 135 longitudinally slidable therein and formed with a wedge shaped lug 136 to enter between the heads 129 as the slide is moved in one direction so as to swing the dogs apart, the slide engaging the opposite ends 137 of the dogs to swing them together upon movement of the slide in the other direction. The slide 135 is moved upwardly to spread the dogs by a roller 138 on the slide riding on a cam 139 mounted on the auxiliary frame N, and the slide is moved in the opposite direction by the roller 138 riding over the cam surface 140. The formation of the stop lugs or ears 134 takes place between the point of insertion of the pouring spout and the point of discharge of the container.

After the stop lugs have been so formed, the carrier moves the container toward the discharge station K, and during this movement the cam section 12 of the carrier is lowered away from the mandrel section 16 by the roller 12ᵃ and cam 12ᵇ, and the lower part 16ᵇ of the mandrel section 16 is elevated by riding of the roller 20 over the cam track 21.

When the carrier has reached the discharge station K, the mandrel section 16 is fully removed from the container and the main section 12 is in alinement with the carrier station. Thereupon the container is preferably automatically ejected from the main section 12 of the carrier as by means of a bell crank lever 141 pivotally mounted on the main section with a follower roller 142 ridable over a cam 143 (see Figures 7, 28 and 29), the other end of the lever being movable through a slot 144 in the main section into engagement with the container. In operation, as the roller 142 strikes the cam 143, the lever 141 is swung with a quick action through the slot 144 to eject the container.

It is desirable to provide means for preventing feeding and insertion of a spout in the absence of a container on the respective carrier so as to avoid the possibility of jamming the machine or injury to parts thereof by a surplus spout.

For this purpose, a bell crank lever 145 is pivotally mounted at 146 on the auxiliary frame N with one arm 147 extending into the path of movement of the carriers, and each carrier has a slot 148 to provide a clearance for the arm 147 when no container is present on the carriage, as shown in Figure 31. When a container is present, the arm 147 is held against entering the slot 148 (see Figure 30). The bell crank is normally influenced by a spring 149 to move the arm 147 into the path of the approaching container. As shown this spring is connected between the frame N and a crank 151 which engages a head 150 on the arm of the bell crank opposite the arm 147. The crank 151 is mounted on a stud shaft 152 journaled on the auxiliary frame N and having a dog 153 to engage the cross rod 49 which connects the feed dogs 48. The feed dogs are normally influenced by a spring plunger 154 (see Figure 20) into feeding relation to the blank strip, but the dogs are normally held out of feeding relation to the blank strip by the lever 145, crank 151 and the dog 153, the latter of which is normally pressed against the cross rod 48 to swing the fingers 50 of the feed dogs away from the blank strip. Should no container be present on the carrier approaching the spout feeding and inserting mechanism, the arm 145 will remain in its normal position so as to hold the feed dogs against feeding, but when a container is present, the lever 145 is actuated as shown in Figure 30 so as to move the dog 153 away from the cross rod 49 and permit the feed dogs to engage the blank strip.

While the invention has been shown as embodied in certain details of construction, it should be understood that this is primarily for the purpose of illustrating the principles of the invention and that many modifications and changes may be made in the details of structure of the machine and in the specific steps of the method without departing from the spirit or scope of the invention. For example, instead of moving the carriage continuously, it might be operated step-by-step in which case the momentary movement of the spout with the container would be unnecessary. However, the present form of the invention is advantageous in that continuous movement of the containers and the momentary movement of the spout with the container during insertion of the spout, provides speedy and efficient production of combined containers and spouts. Furthermore, changes in the form of the spout to be inserted, and consequent changes in the form of the machine and the method, are contemplated, and the specific conditioning of the wall of the container to receive the spout may be widely varied. In some cases it may be unnecessary to slit, score or otherwise precondition the wall.

While I have shown and described the invention as specifically designed for the insertion of pouring spouts into containers, it should be understood that the invention may be utilized for inserting or attaching other parts than pouring spouts into or to other articles than containers.

Having thus described my invention, what I claim is:

1. A machine of the character described comprising a carrier for supporting and moving a container, means for continuously moving said carrier through a predetermined path, means to form slits in a wall of the container during movement of the carrier through said path to receive portions of a spout, mechanism juxtaposed to a portion of and movable along said path of movement for holding a spout, means for moving said mechanism momentarily synchronously with said carrier, and means for inserting said portion of said spout through said slits during said momentary movement.

2. A machine for inserting into a container a pouring spout having a body portion with side wings and prongs projecting from said body portion between said wings, said machine comprising a carrier for supporting and moving a container, means for continuously moving said carrier through a predetermined path, means to form slits in a wall of the container during movement of the carrier through said path to receive said wings and prongs, mechanism juxtaposed to a portion of and movable along said path of movement for holding a spout, means for moving said mechanism momentarily synchronously with said carrier, and means for pushing said spout from said mechanism to insert said wings and prongs through their respective slits during said momentary movement, said carrier including means within said container to cooperate with said container to cooperate with said pushing means for clinching said prongs over the inside of said wall of the container.

3. The machine set forth in claim 2 wherein said carrier also has means within said container for bending portions of said wings within the container to form stop ears.

4. A machine of the character described comprising a carrier for supporting and moving a container, means for continuously moving said carrier through a predetermined path, spout forming and feeding mechanism disposed at one side of said path including means for feeding a flat strip of spout blanks step-by-step, means for bending said blanks to form a body portion and side wings for each spout, and means for punching said blanks to form prongs between said wings, means at a point in said path in advance of said spout forming and feeding means to form slits in a wall of said container to receive said wings and prongs, mechanism juxtaposed to said path for severing the spouts from said strip and pushing said spouts to insert said wings and prongs into their respective slits, and means for momentarily moving said mechanism synchronously with said container and along said path of movement while said wings and prongs are being so inserted.

5. The machine set forth in claim 4 with the addition of means to cooperate with said pushing means for clinching said prongs in said wall of the container.

6. The machine set forth in claim 4 with the addition of means to cooperate with said pushing means for clinching said prongs in said wall of the container, and means within the container for bending portions of said wings to form stop ears to limit movement of the spout out of the container.

7. The machine set forth in claim 4 wherein said means for bending the blanks to form wings and said means to punch said blanks to form prongs operate simultaneously upon different blanks at one step of movement of the strip of blanks.

8. The machine set forth in claim 4 with the addition of an anvil within said container cooperating with said pushing means for clinching said prongs simultaneously with the insertion of the prongs through the respective slits.

9. A machine of the character set forth in claim 4 wherein there are a plurality of carriers movable in succession through said path, each carrier including a plurality of sections to receive and hold a container between them, and means at predetermined points in said path for relatively moving said sections to receive and hold containers prior to and during insertion of said spouts and to release said containers after insertion of the spouts.

10. A machine of the character described comprising a carrier for moving and supporting a container including an outer section to receive the container and an inner mandrel section to be inserted into a container, means for relatively moving said sections to grip and release a container between them, means for moving said carrier through a predetermined path, means at one point in said path for operating upon a portion of one wall of the container to condition it to receive a spout, and means for securing a spout on said portion of said wall.

11. The machine set forth in claim 10 with the addition of a carriage for supporting said carrier, and wherein the mandrel section of said carrier comprises two parts one fixedly mounted on the carriage and having means to cooperate with said spout securing means, and the other part being movable relatively to the first part to grip one wall of the container between itself and said outer section of the carrier, there being yielding means on said outer section to engage said wall of the container, whereby to compensate for container walls of different thickness and accurately locate said portion of the container wall in proper relation to said means on the first part of the mandrel section.

12. The machine set forth in claim 4 with the addition of means for preventing feeding of said blank strip, in the absence of a container on said carrier.

13. The machine set forth in claim 4 wherein said strip feeding means is normally inoperative to feed the strip, and with the addition of means at a point along said path in advance of said strip feeding means actuated by the container on said carrier to start feeding operation of said feeding means, whereby to prevent feeding of a spout when no container is present to receive it.

14. A machine of the character described for securing a pouring spout in a predetermined portion of one well of a container, comprising a carrier for supporting and moving a container and movable in a predetermined path, means juxtaposed to and movable momentarily synchronously with said carrier along a portion of said path for holding a spout, and means for securing said spout in said portion of said wall during said momentary movement.

15. A machine of the character described for inserting portions of a pouring spout through a preformed portion of one wall of the container, comprising a carrier for supporting and moving the container in a predetermined path, means juxtaposed to and movable momentarily synchronously with said carrier along a portion of said path for holding a spout, a ram slidable in said means for pushing said spout to insert said portions of the spout through said preformed portion of the container wall, and means for actuating said ram during said momentary movement.

16. A machine of the character described for inserting portions of a pouring spout through a preformed portion of one wall of the container, comprising a carrier for supporting and moving the container in a predetermined path, means juxtaposed to and movable along a portion of said path to receive at one position and hold a spout, means actuated by said carrier for momentarily moving said spout holding means along said path in the direction of movement of said carrier, means for returning said spout holding means in the opposite direction to said spout receiving position, and means for securing said spout in said portion of said wall during said momentary movement.

17. A machine of the character described comprising a carrier for supporting and moving a container, means for continuously moving said carrier through a predetermined path, spout forming and feeding mechanism disposed at one side of said path including means for feeding a flat strip of spout blanks step-by-step, means for bending said blanks to form a body portion and side wings for each spout, and means for punching said blanks to form prongs between said wings, means at a point in said path in advance of said spout forming and feeding means to form slits in a wall of said container to receive said wings and prongs, mechanism juxtaposed to said path for severing the spouts from said strip and pushing said spouts to insert said wings and prongs into their respective slits, and means to cooperate with said pushing means for clinching said prongs in the wall of the container.

18. A machine of the character described comprising a carrier for supporting and moving a container having a portion of its wall formed to receive the wings and prongs of a spout, means for moving said carrier through a predetermined path, spout forming and feeding mechanism including means for feeding a flat strip of spout blanks step-by-step, means for bending said blanks to form a body portion and side wings for each spout, and means for punching said blanks to form prongs between said wings, mechanism disposed at one side of said path for severing the spouts from said strip and pushing said spouts to insert said wings and prongs through said portion of said wall of the container, and means to cooperate with said pushing means for clinching said prongs in the wall of the container.

19. A machine of the character described for securing a part in a predetermined portion of an article, comprising a carrier for supporting and moving the article and movable in a predetermined path, reciprocable means juxtaposed to and movable momentarily synchronously with said carrier along a portion of said path for holding said part, means for feeding a part to said reciprocable means at one limit of reciprocation thereof, and means for securing said part in said portion of said article during said momentary movement of said reciprocable means in one direction.

20. A machine of the character described for inserting a part through a preformed portion of an article, comprising a carrier for supporting and moving the article in a predetermined path, reciprocable means juxtaposed to and movable momentarily synchronously with said carrier along a portion of said path for holding said part, means for feeding a part to said reciprocable means at one limit of the reciprocation thereof, a ram slidable in said means for pushing said part to insert said part through said preformed portion of the article, and means for actuating said ram during said momentary movement of said reciprocable means in one direction.

21. A machine of the character described comprising a carrier for moving and supporting an article, means for moving said carrier through a predetermined path, means juxtaposed to one point in said path for operating on a portion of said article to prepare said portion to receive a part, said carrier having a portion to cooperate with said operating means as said carrier is moved past said point, means juxtaposed to another point in said path for attaching said part to said article, said carrier also having a portion to cooperate with attaching means for attaching the part to the article, and means for adjusting said article on said carrier to move said prepared portion of the article from the first-mentioned portion to the second-mentioned portion of the carrier during movement of the carrier from the first-mentioned point to the second-mentioned point.

22. In a machine of the character described a carriage, a carrier on said carriage for supporting a hollow article and including an outer section to receive the article and an inner mandrel section to be inserted into the article, said mandrel section including two parts, one fixed on said carriage and the other movable relatively to the fixed part to grip the article between itself and said outer section, and means for moving said outer section and said movable part of said mandrel section simultaneously relative to the fixed part of the mandrel section to adjust the article relative to said fixed part.

23. In the machine set forth in claim 22, the addition of means for operating upon a portion of said article to prepare it to receive a part to be attached to the article, and means for attaching said part to said prepared portion of the article, said fixed part of the mandrel section of the carrier having two spaced portions one to cooperate with said operating means and the other to cooperate with said attaching means, and said means for moving said outer section and said movable part of the mandrel section simultaneously serving to adjust said article to move said prepared portion of the article from the first-mentioned to the second-mentioned portion of said fixed part of the mandrel section.

24. In the machine set forth in claim 22, the addition of means for moving said carrier in a predetermined path, means juxtaposed to one point in said path for operating on said article to prepare it to receive a part to be attached to the article, and means at another point in said path for attaching said part to said prepared portion of the article, said fixed part of said mandrel section having two spaced portions one to cooperate with said operating means and the other to cooperate with said attaching means during movement of said carrier past the respective points, and said means for moving the outer section and said movable part of the mandrel section simultaneously serving to adjust said article to move said prepared portion of the article from the first-mentioned to the second-mentioned portion of said fixed part of the mandrel section during said movement of said carrier from said operating means to said attaching means.

25. A machine of the character described for securing a part in a predetermined portion of an article, comprising a carrier means for moving a plurality of articles continuously in a predetermined path in spaced relation to each other, a plurality of part holding means juxtaposed to said path in predetermined spaced relation to each other each for holding one of said parts and movable along a portion of said path, means for momentarily simultaneously moving all of said part holding means synchronously with said carrier means along said portion of said path, and means for securing each of said parts in said portion of one of said articles during said momentary movement.

26. A machine of the character described for securing a part in a predetermined portion of an article, comprising carrier means for moving a plurality of articles continuously in a predetermined path in spaced relation to each other, a plurality of part holding means juxtaposed to said path in predetermined spaced relation to each other each for holding one of said parts and movable along a portion of said path, means for momentarily simultaneously moving all of said part holding means synchronously with said carrier means along said portion of said path, a ram slidable in each of said part holding means for pushing the corresponding part into said portion of one of said articles during said momentary movement, and means for simultaneously actuating said rams.

27. A machine for attaching parts to articles, comprising a carriage having a plurality of carriers, one for each article, means for actuating said carriage to move said carriers in a predetermined path, means for feeding said parts in succession at a point in juxtaposition to said path, means common to said carriers and movable with each thereof in succession and synchronously therewith during movement of said carriers through a portion of said path for receiving and moving each part from said point, and means for attaching a part to an article during each successive synchronous movement.

28. A machine of the character described comprising a carrier for supporting and moving a container that has a portion formed to receive a spout, means for continuously moving said carrier through a predetermined path, mechanism disposed at one side of said path including means for feeding a flat strip of spout blanks step-by-step, forming means for shaping said blanks into spouts, and means for severing the spouts from said strip, mechanism juxtaposed to said path to receive said spouts from said forming means and insert said spouts into said portion of each container, and means for preventing feeding of said blank strip in the absence of a container on said carrier as the latter approaches said mechanism.

29. A machine of the character described comprising a carrier for supporting and moving a container that has a portion formed to receive a spout, means for continuously moving said carrier through a predetermined path, mechanism disposed at one side of said path including means for feeding a flat strip of spout blanks step-by-step, forming means for shaping said blanks into spouts, and means for severing the spouts from said strip, mechanism juxtaposed to said path to receive said spouts from said forming means and insert said spouts into said portion of each container, said strip feeding means being normally inoperative to feed the strip, and means at a point in advance of said strip feeding means actuated by the container on said carrier to start feeding operation of said feeding means, whereby to prevent feeding of a spout when no container is present to receive it.

30. A machine of the character described comprising a carrier for moving and supporting a container that has a portion of one wall formed to receive a spout, said carrier including an outer section to receive the container and an inner mandrel section to be inserted into a container, means for moving said carrier through a predetermined path, spout inserting means at one point in said path for inserting a spout into said portion of the wall of the container, and means for relatively moving said sections of said carrier to grip a container between them prior to the approach of the carrier to said spout inserting means and to release said container after said carrier has passed said spout inserting means respectively.

31. A machine of the character described comprising a carrier for supporting and moving a container that has a portion formed to receive a spout, means for continuously moving said carrier through a predetermined path, spout forming and feeding mechanism disposed at one side of said path including means for feeding a flat strip of spout blanks step-by-step, forming means for shaping said blanks into spouts, mechanism juxtaposed to said path for severing spouts from said strip and inserting them into said portions of said container, and means for momentarily moving said mechanism synchronously with said container and along said path of movement while said spout is being inserted.

32. In a machine of the character described, means for feeding step-by-step a strip of flat blanks for spouts including a guide for the strip, means juxtaposed to said guide for forming said blanks into said spouts as the strip passes through said guide, mechanism juxtaposed to said guide for severing the completed spouts in succession from said strip, means for moving in succession to and in timed relation to the operation of said mechanism, containers each having a portion of one wall formed to receive one of said spouts from said mechanism, and means for receiving said spouts from said mechanism and attaching them to said portions of the walls of the container.

33. In a machine of the character described for inserting the wings of a pouring spout through slits in the wall of a container, a mandrel to be inserted inside said container in juxtaposition to said wall and having a recess therein and slots leading into said recess to receive said wings edgewise, and means movable in said recess transversely of said slots and cooperating with the walls of the recess to engage and bend portions of said wings that project within the recess to form stop ears on said wings.

34. In a machine of the character described for inserting through one wall of a container the prongs on the body portion of a spout to secure the spout on said wall, a mandrel to be inserted inside said container with a surface in abutting juxtaposition to said wall, said surface having recesses to receive said prongs and the walls of said recesses being formed to bend said prongs upon themselves as they are thrust endwise through said wall, and means for moving said spout to force said prongs through said wall into said recesses.

HENRY BRUCKER.